US012388902B2

(12) United States Patent
Teshome et al.

(10) Patent No.: US 12,388,902 B2
(45) Date of Patent: Aug. 12, 2025

(54) SYSTEM AND METHOD FOR PROVIDING DYNAMIC ANTENNA MAPPING WITHIN AN INFORMATION HANDLING SYSTEM

(71) Applicant: Dell Products, LP, Round Rock, TX (US)

(72) Inventors: Abeye Teshome, Austin, TX (US); Suresh K. Ramasamy, Cedar Park, TX (US); Liam B. Quinn, Austin, TX (US); Julius Mueller, Santa Cruz, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 233 days.

(21) Appl. No.: 17/510,605

(22) Filed: Oct. 26, 2021

(65) Prior Publication Data

US 2023/0128527 A1   Apr. 27, 2023

(51) Int. Cl.
*H04L 43/0876* (2022.01)
*H04L 67/30* (2022.01)
*H04L 67/303* (2022.01)
*H04L 67/63* (2022.01)
*H04W 24/02* (2009.01)

(52) U.S. Cl.
CPC .......... *H04L 67/303* (2013.01); *H04L 67/30* (2013.01); *H04L 67/63* (2022.05); *H04W 24/02* (2013.01)

(58) Field of Classification Search
CPC ....... H04L 67/303; H04L 67/30; H04L 67/63; H04L 67/306; H04W 24/02
See application file for complete search history.

(56) References Cited

U.S. PATENT DOCUMENTS

| | | | |
|---|---|---|---|
| 10,128,902 B1* | 11/2018 | Cheung | H04B 1/715 |
| 2012/0190389 A1* | 7/2012 | Hui | H04B 7/024 |
| | | | 455/500 |
| 2014/0200036 A1* | 7/2014 | Egner | H04W 8/245 |
| | | | 455/456.3 |
| 2015/0334523 A1* | 11/2015 | Lappetelainen | H04W 4/00 |
| | | | 455/456.1 |
| 2018/0184231 A1* | 6/2018 | Egner | H04W 24/10 |
| 2018/0375939 A1* | 12/2018 | Magalhães de Matos | |
| | | | H04L 41/12 |
| 2020/0137690 A1* | 4/2020 | Min | H04W 52/0229 |
| 2022/0182816 A1* | 6/2022 | Kuang | H04L 5/0053 |

FOREIGN PATENT DOCUMENTS

CN   110995514 A   *   4/2020 ......... H04L 41/0893

* cited by examiner

*Primary Examiner* — Atique Ahmed
(74) *Attorney, Agent, or Firm* — Prol Intellectual Property Law, PLLC; H. Kenneth Prol

(57) ABSTRACT

An information handling system is disclosed and may include a processor, a memory, and a power management unit (PMU). The processor may execute code instructions of a dynamic antenna mapping task agent that is configured to generate an optimized antenna mapping plan for one or more applications, one or more containers of related applications, or a combination thereof, wherein the optimized mapping plan determines which of the one or more applications, one or more containers, or a combination thereof is to use which one of one or more antennas, one or more wireless connections, or a combination thereof within the information handling system while the one or more application, one or more container, or combination thereof is operating within the information handling system.

12 Claims, 11 Drawing Sheets

SYSTEM AND METHOD FOR PROVIDING DYNAMIC ANTENNA MAPPING WITHIN AN INFORMATION HANDLING SYSTEM

FIELD OF THE DISCLOSURE

The present disclosure generally relates to mapping a plurality of antennas to a plurality applications within an information handling system. More particularly, the present disclosure relates to dynamically mapping a plurality of antennas to a plurality of applications within an information handling system based on real-time application data and real-time connectivity data.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. During operation of an information handling system, many different applications may require connectivity to one or more networks via wireless connections, e.g., 4G, 5G, Bluetooth, Wi-Fi, etc. These connections may be facilitated by various antennas.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
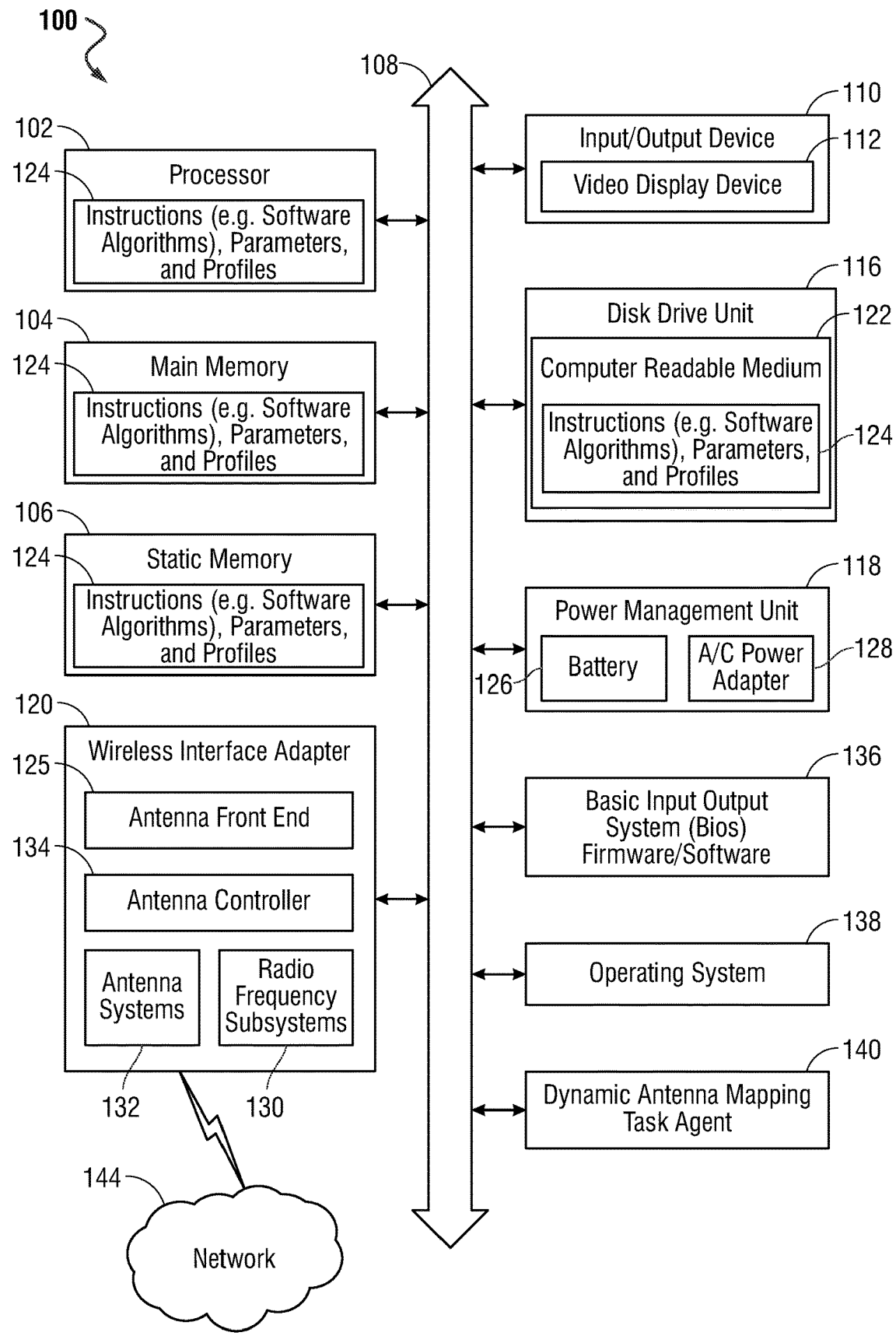
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A typical information handling system may have numerous applications installed thereon. These applications may include antivirus programs, audio players, chat software, communication software, database management programs, email programs, games, HTML editing software, Internet browsers, messaging software, photo editing software, presentation software, programming language, simulators, spreadsheet programs, video editing software, video players, and word processing software. Many of these applications require access to a network in order to operate. For example, an Internet browser can only provide information to the user when it is connected to the Internet via a Wi-Fi connection or similar connection. In many instances an application may require different wireless connections at the same time. A gaming application, for example, may require a network connection to interact with other players via a network, a wireless connection for a game controller, and a wireless connection for a headset/microphone. These connections may be facilitated via one or more 4G/5G wireless wide area network (WWAN) antennas, via one or more wireless local area network (WLAN) antennas, one or more Wi-Fi adapters, one or more Bluetooth adapters, or a combination thereof. One or more of the applications may be associated with software containers or a group of applications that execute together. For example, a security container may include antivirus software, authentication, managed system security, monitoring, and other similar applications. A streaming content container may include audio, video, and other similar applications. An update container may include applications that require regular updates.

When multiple applications are in use an information handling system and each is utilizing one or more antennas, the workload spread across the antennas needs to be properly managed in order to facilitate the most efficient use of those antennas and maximize the efficiency of the information handling system. Rather, in some embodiments, priority of some applications may require management of antenna mapping among a plurality of available antennas and RANs to meet the wireless needs of prioritized applications relative to lower priority applications according to some embodiments. During operation, a dynamic antenna mapping task agent may receive real-time operational data from one or more applications installed and operating within the information handling system, real-time operational data from one or more containers of associated applications within the information handling system, real-time operational data from one or more antennas, real-time operation data from one or more Wi-Fi radios, WWAN radios, Bluetooth (BT) radios, or other radios, real-time operational data from one or more radio access networks (RANs), or a combination thereof.

The dynamic antenna mapping agent may use this real-time operational data to determine an optimized antenna mapping plan for the one or more applications or containers of applications. This optimized antenna mapping plan may determine which applications or containers of applications are to use which antennas or wireless connections within the information handling system. In particular, the optimized antenna mapping plan may be a dynamic plan that is constantly changing, or changeable, and may allow applications operating in the information handling system that consistently use higher bandwidth at one or more radio antennas to be given priority over other applications that use less bandwidth. Further, the optimized antenna mapping plan may spread the workload over a plurality of antennas so that a particular application that is consistently using higher bandwidth at a particular radio antenna may have the workload associated with that particular application split between plural radio antennas or pull in plural antennas for multiple input multiple output (MIMO) operation and enhanced data bandwidth. The optimized antenna mapping plan may be based on a location, a time of day, a day of the week, or combination thereof. As such, the dynamic antenna mapping task agent may optimize the use of the various antennas operating within the information handling system for various applications at various times of day, various locations, and various days of the week.

Thus, the system and methods disclosed herein may dynamically and substantially improve the efficiency of a plurality of wireless connections operating within an information handling system by using real-time operational data for the information handling system as well as available RANs to modify one or more antenna settings to create an optimized antenna mapping plan that can be continuously modified based on the location of the information handling system, the applications running within the information handling system, and network issues outside of the information handling system. Each version of an optimized antenna mapping plan may be stored with a time stamp showing the time of the day, the day of the week, and the location of the information handling system. These versions of the optimized antenna mapping plans may then be used predictively and as similar system parameters within the information handling system are encountered, the dynamic antenna mapping task agent may predict connectivity issues and preemptively send an optimized antenna mapping plan that closely matches the current conditions within the information handling system to an antenna controller and the antenna controller may, or may not, change the current settings to match the optimized antenna mapping plan.

FIG. 1 illustrates an information handling system 100 similar to information handling systems according to several embodiments of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic information handling system, a network server or storage device, a network router, switch, or bridge, wireless router, or other network communication information handling system, a network connected device (cellular telephone, tablet information handling system, etc.), IoT computing device, wearable computing device, a set-top box (STB), a mobile device, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic information handling systems that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of an antenna selection algorithm, and drive unit 116 (volatile (e.g., random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device 112, such as a keyboard, and/or a cursor control device, such as a mouse, touchpad, or gesture or touch screen input device. The information handling system 100 can also include a disk drive unit 116.

The network interface device shown as wireless interface adapter 120 can provide connectivity to a network 144, e.g., a wide area network (WAN), a local area network (LAN), wireless local area network (WLAN), a wireless personal area network (WPAN), a wireless wide area network (WWAN), or another network. In an embodiment, the WAN, WWAN, LAN, and WLAN may each include an access point used to operatively coupled the information handling system 100 to a network. In a specific embodiment, the network 144 may include macro-cellular connections via one or more base stations 162 or a wireless access points 160 (e.g., Wi-Fi or WiGig), or such as through licensed or unlicensed WWAN small cell base stations.

Connectivity may be via wired or wireless connection. Wireless interface adapter 120 may include one or more radio frequency subsystems 130 with transmitter/receiver circuitry, modem circuitry, one or more radio frequency front end circuits, one or more wireless controller circuits, amplifiers, antenna systems 132 and other circuitry of the radio frequency subsystem 130 such as one or more antenna ports used for wireless communications via multiple radio access technologies. Each radio frequency subsystem 130 may communicate with one or more wireless technology protocols. The radiofrequency subsystem 130 may contain individual subscriber identity module (SIM) profiles for each technology service provider and their available protocols for any operating subscriber-based radio access technologies such as cellular LTE communications.

The wireless interface adapter 120, also known as a wireless interface device, may also include antenna systems 132 which may include any number of tunable antenna systems for use with the system and methods disclosed herein. Additional antenna system modification circuitry (not shown) may also be included with the wireless interface adapter 120 to implement coexistence control measures via an antenna controller 134 as described in various embodiments of the present disclosure.

In some embodiments of the present disclosure, the wireless interface adapter 120 may operate two or more wireless links. In a further embodiment, the wireless interface adapter 120 may operate the two or more wireless links with a single, shared communication frequency band such as with the 5G standard relating to unlicensed wireless spectrum for small cell 5G operation or for unlicensed Wi-Fi WLAN operation in an example embodiment. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas or antennas may be capable of operating at a variety of frequency bands.

The wireless interface adapter 120 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. Wireless interface adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 144 may be based on the radio access network (RAN) standards that implement, for example, eNodeB or gNodeB hardware connected to mobile phone networks (e.g., cellular networks) used to communicate with the information handling system 100. In the example embodiment, mobile device 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end of the information handling system 100 may operate on a licensed WWAN wireless radio with authorization for subscriber access to a wireless service provider on a carrier licensed frequency band.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more radio frequency subsystems 130 including transmitters and wireless controllers for connecting via a multitude of wireless links. In an example embodiment, an information handling system may have an antenna system transmitter for 5G small cell WWAN, Wi-Fi WLAN or WiGig connectivity and one or more additional antenna system transmitters for macro-cellular communication. The radio frequency subsystems 130 include wireless controllers to manage authentication, connectivity, communications, power levels for transmission, buffering, error correction, baseband processing, and other functions of the wireless interface adapter 120.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 112, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize information handling system 100 on power up, to launch an OS 138, and to manage input and output interactions between the OS 138 and the other elements of information handling system 100. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in a storage system (not illustrated) associated with network channel of a wireless interface adapter 120, in another storage medium of information handling system 100, or a combination thereof. Executable code instructions 124 for application programs and BIOS firmware/software 136 can each be implemented as single programs, or as separate programs carrying out the various features as described herein.

As shown in FIG. 1, the information handling system 100 may further include a dynamic antenna mapping task agent 140. During operation, the dynamic antenna mapping task agent 140 may receive real-time operational data from applications, real-time operational data from containers, real-time operational data from one or more antennas, real-time operation data from one or more Wi-Fi modems, real-time operational data from a radio access network (RAN), or a combination thereof and use the real-time operational data to determine an optimized antenna mapping plan for one or more applications. This optimized antenna mapping plan may set forth, outline, determine, or prescribe, which applications are to use which antennas or wireless connections within the information handling system 100. In particular, the optimized antenna mapping plan may be a dynamic plan that is constantly changing, or changeable, and may allow applications operating in the information handling system 100 that consistently use higher bandwidth at one or more radio antennas to be given priority over other applications that use less bandwidth. Further, the optimized antenna mapping plan may spread the workload over a plurality of antennas so that a particular application that is consistently using higher bandwidth at a particular radio antenna may have the workload associate with that particular application split between multiple radio antennas. The optimized antenna mapping plan may be based on a location, a time of day, a day of the week, or combination thereof. As such, the dynamic antenna mapping task agent 140 may optimize the use of the various antennas operating within the information handling system 100 for various applications at various times of day, various locations, and various days of the week.

In an embodiment, the information handling system 100 may connect to an external wireless network 144. In particular, the wireless network 144 may have a wireless mesh architecture in accordance with mesh networks described by the wireless data communications standards or similar standards in some embodiments but not necessarily in all embodiments. The wireless interface adapter 120 may connect to the external wireless network 144 via a WPAN, WLAN, WWAN or similar wireless switched Ethernet connection in some embodiments. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the wireless network 144. Further, the instructions 124 may be transmitted or received over the wireless network 144 via the network interface device, i.e., the wireless interface adapter 120.

The wireless interface adapter 120 represents a network interface card (NIC) disposed within information handling system 100, on a main circuit board of the information handling system, integrated onto another component such as processor 102, in another suitable location, or a combination thereof. The wireless interface adapter 120 can include another information handling system, a data storage system, another network, a grid management system, another suitable resource, or a combination thereof. In an embodiment, the wireless interface adapter 120 may operably connect to the network 144. The connection to network 144 may be wired or wireless.

The network interface device shown as wireless interface adapter 120 can provide connectivity to the network 144, such as a wide area network (WAN), a local area network (LAN), wireless local area network (WLAN), a wireless personal area network (WPAN), a wireless wide area network (WWAN), or another network. Connectivity may be via wired or wireless connection. The wireless interface adapter 120 may include an adaptive massive MIMO Multiplexer with transmitter/receiver circuitry, wireless controller circuitry, amplifiers and other circuitry for wireless communications. The wireless interface adapter 120 may also include antenna systems 132 as described above which may be tunable antenna systems for use with the system and methods disclosed in the embodiments herein. The antenna controller 134 may also include wireless controllers to manage authentication, connectivity, communications, power levels for transmission, buffering, error correction, baseband processing, and other functions of the wireless interface adapter 120.

The information handling system 100 can include a set of instructions 124 that can be executed to cause the computer system to perform any one or more of the methods or computer-based functions disclosed herein. For example, instructions 124 may execute an antenna selection algorithm, various software applications, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 134 to perform the processes described herein. Similarly, main memory 104 and static memory 106 may also contain a computer-readable medium for storage of one or more sets of instructions, parameters, or profiles 124 including one or more look-up tables and/or one or more antenna selection algorithms 164. The disk drive unit 116 or static memory 106 also contain space for data storage. Further, the instructions 124 may embody one or more of the methods or logic as described herein. In a particular embodiment, the instructions, parameters, and profiles 124 may reside completely, or at least partially, within the main memory 104, the static memory 106, and/or within the disk drive 116 during execution by the processor 102 or an antenna controller 134 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The antenna selection algorithm 164 and sideband serial messaging protocol 142 and the drive unit 116 may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
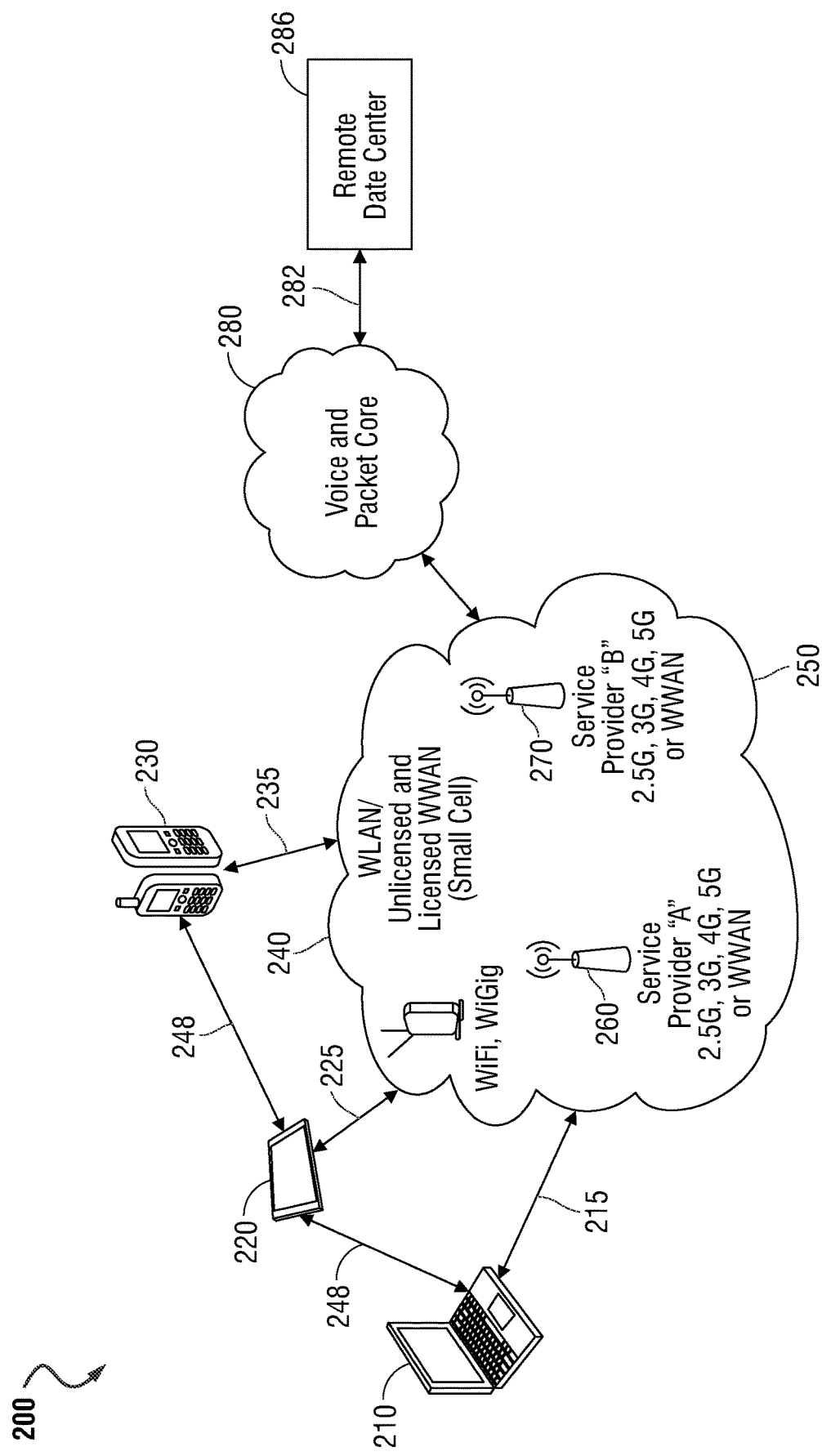
FIG. 2 is a block diagram of a network environment offering several communication protocol options and mobile information handling systems according to an embodiment of the present disclosure.

FIG. 2 illustrates a network 200 that can include one or more information handling systems 210, 220, 230 according to embodiments herein. The information handling systems 210, 220, 230 shown in FIG. 2 may be similar to the information handling system 100 described in connection with FIG. 1. In a particular embodiment, network 200 includes networked mobile devices 210, 220, and 230, wireless network access points, and multiple wireless connection link options. A variety of additional computing resources of network 200 may include client mobile devices, data processing servers, network storage devices, local and wide area networks, or other resources as needed or desired. As partially depicted, information handling systems 210, 220, 230 may be a laptop computer, tablet computer, 360-degree convertible systems, wearable computing devices, or a smart phone device. These mobile devices 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points or base stations may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, and antenna mounting locations (e.g., spatial locations within the information handling system) associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 144 may be based on the radio access network (RAN) standards that implement, for example, eNodeB or gNodeB hardware connected to mobile phone networks (e.g., cellular networks) used to communicate with the information handling system 100. In the example embodiment, mobile device 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling system 100 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile device 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile device 210, 220 or 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein.

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile device or may connect directly to one or more mobile devices 210, 220, and 230. Alternatively, mobile devices 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile devices 210, 220, and 230 allowing streamlining and efficiency within those devices. Similarly, remote data center permits fewer resources to be maintained in other parts of network 200.

Although 215, 225, and 235 are shown connecting wireless adapters of mobile devices 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other embodiments, mobile devices 210, 220, and 230 may communicate intra-device via 248 when one or more of the mobile devices 210, 220, and 230 are set to act as an access point or even potentially an WWAN connection via small cell communication on licensed or unlicensed WWAN connections. For example, one of mobile devices 210, 220, and 230 may serve as a Wi-Fi hotspot in an embodiment. Concurrent wireless links to information handling systems 210, 220, and 230 may be connected via any access points including other mobile devices as illustrated in FIG. 2.

Figure 3:
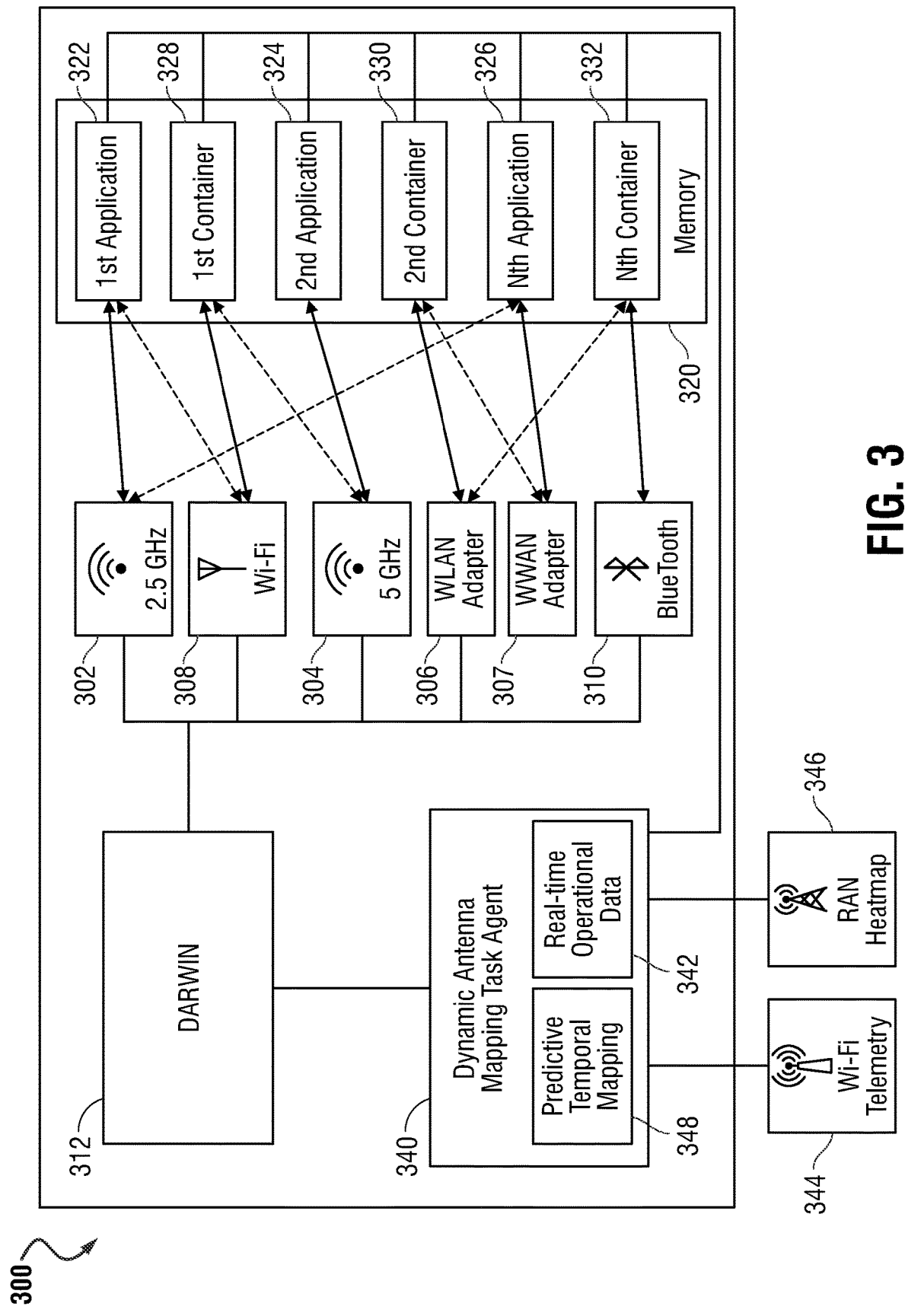
FIG. 3 is a block diagram of a system for dynamically mapping a plurality of antennas to a plurality of applications within an information handling system according to an embodiment of the present disclosure.

Referring now to FIG. 3, an information handling system according to an embodiment of the present disclosure is illustrated and is generally designated 300. The information handling system 300 may be the similar to the information handling system 100 shown in FIG. 1 with the additional elements shown in FIG. 3. In particular, as depicted, the information handling system 300 may include a first antenna 302 operating at a first frequency, e.g., 2.5 GHz. The information handling system 300 may include a second antenna 304 operating at a second frequency, e.g., 5 GHz. It is to be understood that other frequencies are contemplated. Further, it is to be understood that other antennas are contemplated. In an embodiment, the information handling system 300 may include a wireless local area network (WLAN) adapter 306 and a wireless wide area network (WWAN) adapter 307. Additionally, the information handling system 300 may include a Wi-Fi adapter 308 and a Bluetooth adapter 310.

As illustrated in FIG. 3, the information handling system 300 may include a dynamic wireless antenna management, re-configuration and integration (DARWIN) module 312 that may be connected to the first antenna 302, the second antenna 304, the WLAN adapter 306, the WWAN adapter 307, the Wi-Fi adapter 308, and the Bluetooth adapter 310. During operation of the information handling system 300, the DARWIN module 312 may be considered an antenna controller and may control the operation of the first antenna 302, the second antenna 304, the WLAN adapter 306, the WWAN adapter 307, the Wi-Fi adapter 308, and the Bluetooth adapter 310. The DARWIN module 312 and the dynamic antenna mapping task agent may integrate these radios and antenna systems with wireless data needs of one or more applications executing on the information handling system 300 by the CPU, embedded controller, or other processor logic according to embodiments herein.

The information handling system 300 may include a memory 320 in which a first application may reside 322. The information handling system 300 may also include a second application 324 within the memory 320. Further, the information handling system 300 may include an Nth application 326 stored within the memory 320. It is to be understood that the Nth application 326 within the memory 320 of the information handling system 300 is an indication that the information handling system 300 may include any number of applications within the memory 320. It is also to be understood that the first application 322, the second application 324, and the Nth application 326 are software or computer programs that may include a set of instructions executable by a processor, controller, or other processing logic and that may receive data input, manipulate the data, and output a result. Moreover, the first application 322, the second application 324, and the Nth application 326 may allow a user to interact with the information handling system 300 and the hardware therein. Further, the first application 322, the second application 324, and the Nth application 326 may allow one or more users of the information handling system 300 to perform various tasks with the information handling system 300. Examples of applications include, but are not limited to, antivirus programs, audio players, chat software, communication software, database management programs, email programs, games, HTML editing software, Internet browsers, messaging software, photo editing software, presentation software, programming language, simulators, spreadsheet programs, video editing software, video players, smart phone applications, and word processing software.

FIG. 3 also shows that the information handling system 300 may include a first container 328 within the memory 320 in an embodiment. Moreover, the information handling system 300 may include a second container 330 within the memory 320. As shown, the information handling system 300 may also include an Nth container 332. It is to be understood that the Nth container 332 within the memory 320 of the information handling system 300 is an indication that the information handling system 300 may include any number of containers within the memory 320. It is to be understood that the first container 328, the second container 330, and the Nth container 332 may be modular units into which the first application 322, the second application 324, and the Nth application 326 and the system level configuration and environment of the first application 322, the second application 324, and the Nth application 326 may be encapsulated. Each of the first container 328, the second container 330, and the Nth container 332 may have a dedicated filesystem (not shown) within the memory 320. One or more applications 322, 324, 326 may be associated with each of the containers 328, 330, 332.

During operation of the information handling system 300 each of the first application 322, the second application 324, and the Nth application 326 or each of the first container 328 and associated applications 322, 324, 326, the second container 330 and associated applications 322, 324, 326, and the Nth container 332 and associated applications 322, 324, 326 may utilize the first antenna 302, the second antenna 304, the WLAN adapter 306, the WWAN adapter 307, the Wi-Fi adapter 308, the Bluetooth adapter 310, or a combination thereof, to communicate with one or more networks or other devices. For example, if a user was playing a game application, the game application may communicate with a network of other gamers via the first antenna 302, the second antenna 304, the WLAN adapter 306, the WWAN adapter 307, the Wi-Fi adapter 308, or a combination thereof. At the same time, a headset providing audio to the user may be communicating via the Bluetooth adapter 310.

Still referring to FIG. 3, the information handling system 300 may include a dynamic antenna mapping task agent 340 in an embodiment. The dynamic antenna mapping task agent 340 may be connected to the DARWIN module 312 and as such, the dynamic antenna mapping task agent 340 may receive real-time operational data 342 from the DARWIN module 312 for the first antenna 302, the second antenna 304, the WLAN adapter 306, the WWAN adapter 307, the Wi-Fi adapter 308, and the Bluetooth adapter 310. The real-time operational data for the first antenna 302, the second antenna 304, the WLAN adapter 306, the WWAN adapter 307, the Wi-Fi adapter 308, and the Bluetooth adapter 310 may include a workload for the first antenna 302, the second antenna 304, the WLAN adapter 306, the WWAN adapter 307, the Wi-Fi adapter 308, and the Bluetooth adapter 310, i.e., a real-time mapping that details which application 322, 324, 326 is currently using any of the first antenna 302, the second antenna 304, the WLAN adapter 306, the WWAN adapter 307, the Wi-Fi adapter 308, and the Bluetooth adapter 310. The real-time operational data for the first antenna 302, the second antenna 304, the WLAN adapter 306, the WWAN adapter 307, the Wi-Fi adapter 308, and the Bluetooth adapter 310 may also include RAN availability, wireless link conditions, or a combination thereof. Additionally, the dynamic antenna mapping task agent 340 may receive real-time operational data 342 from the first application 322, the second application 324, and the Nth application 326. For example, the real-time operational data 342 for the applications 322, 324, 326 may include type of wireless connection used, bandwidth used, length of time used, time of day used, day of the week used, or a combination thereof. Further, the dynamic antenna mapping task agent 340 may receive real-time operational data from the first container 328, the second container 330, and the Nth container 332. The real-time operational data for the applications 322, 324, 326, containers 328, 330, 332, or available RANs may include cadence, throughput, state, associations, network connection data, timestamps, or a combination thereof. The cadence may be the timespan over which an application 322, 324, 326; a container 328, 330, 332; or a combination thereof repeats a request for data. The throughput may be the amount of data passing to a particular application 322, 324, 326; container 328, 330, 332; or a combination thereof. The state may indicate whether a particular application 322, 324, 326; container 328, 330, 332; or a combination thereof is active, passive, sleeping, or in a deep sleep. The association of a particular application 322, 324, 326; container 328, 330, 332; or a combination thereof may indicate an association of one or more applications 322, 324, 326 and systems for a particular container 328, 330 332 and network connection data may indicate the particular network connection, e.g., antenna, Wi-Fi adapter, Bluetooth adapter, or combination thereof, that the particular application 322, 324, 326; container 328, 330, 332; or a combination thereof uses most frequently. The timestamps may indicate a particular time and date that a particular application 322, 324, 326; container 328, 330, 332; or a combination thereof accessed an asset such as a wireless network connection and the local radio system and antenna.

FIG. 3 also shows that the dynamic antenna mapping task agent 340 may be connected to a Wi-Fi modem 344 and a radio access network (RAN) 346 according to an embodiment. During operation of the information handling system 300, the dynamic antenna mapping task agent 340 may receive real-time operational data from the Wi-Fi modem 344. That data can include Wi-Fi telemetry from the Wi-Fi modem 344 that may include download speed, upload speed, signal strength, traffic, etc. Also, during operation of the information handling system 300, the dynamic antenna mapping task agent 340 may include real-time operational data from the RAN 346. That data can include a RAN heatmap. The RAN heatmap may include information concerning the demand for usage at the RAN 346. Further, the RAN heatmap may include wireless availability and signal strength at particular locations.

During operation of the information handling system 300, the dynamic antenna mapping task agent 340 may perform one or more of the method steps, described below, in order to optimize the mapping between one or more of the first application 322, the second application 324, the Nth application 326, or the first container 328, the second container 330, or the Nth container 332 of associated applications with one or more of the first antenna 302, the second antenna 304, the WLAN adapter 306, the WWAN adapter 307, the Wi-Fi adapter 308, and the Bluetooth adapter 310. In particular, the dynamic antenna mapping task 340 may analyze the real-time operational data 342 from the DARWIN module 312 for the first antenna 302, the second antenna 304, the WLAN adapter 306, the WWAN adapter 307, the Wi-Fi adapter 308, and the Bluetooth adapter 310; the real-time operational data 342 from the first application 322, the second application 324, and the Nth application 326; the real-time operational data from the first container 328, the second container 330, and the Nth container 332; the real-time operational data from the Wi-Fi modem 344; and the real-time operational data from the RAN 346 in order to create the optimal antenna mapping plan for each of the first application 322, the second application 324, the Nth application 326, the first container 328, the second container 330, and the Nth container 332 with respect to connecting to the first antenna 302, the second antenna 304, the WLAN adapter 306, the WWAN adapter 307, the Wi-Fi adapter 308, and the Bluetooth adapter 310. The optimal map for each of the first application 322, the second application 324, the Nth application 326, or the first container 328, the second container 330, and the Nth container 332 of associated applications and support may be determine based on a time of day for each day of the week. The dynamic antenna mapping task agent 340 may use the optimization process to create a predictive temporal mapping 348. The predictive temporal mapping 348 may use past time/date stamped optimized maps to determine future mapping. For example, if a particular user schedules video conferences at the same time every day, the dynamic antenna mapping task agent 340 can push a mapping plan to the DARWIN module 312 and the DARWIN module 312 can ensure the proper antenna configuration for use by the video conferencing application.

Figure 4:
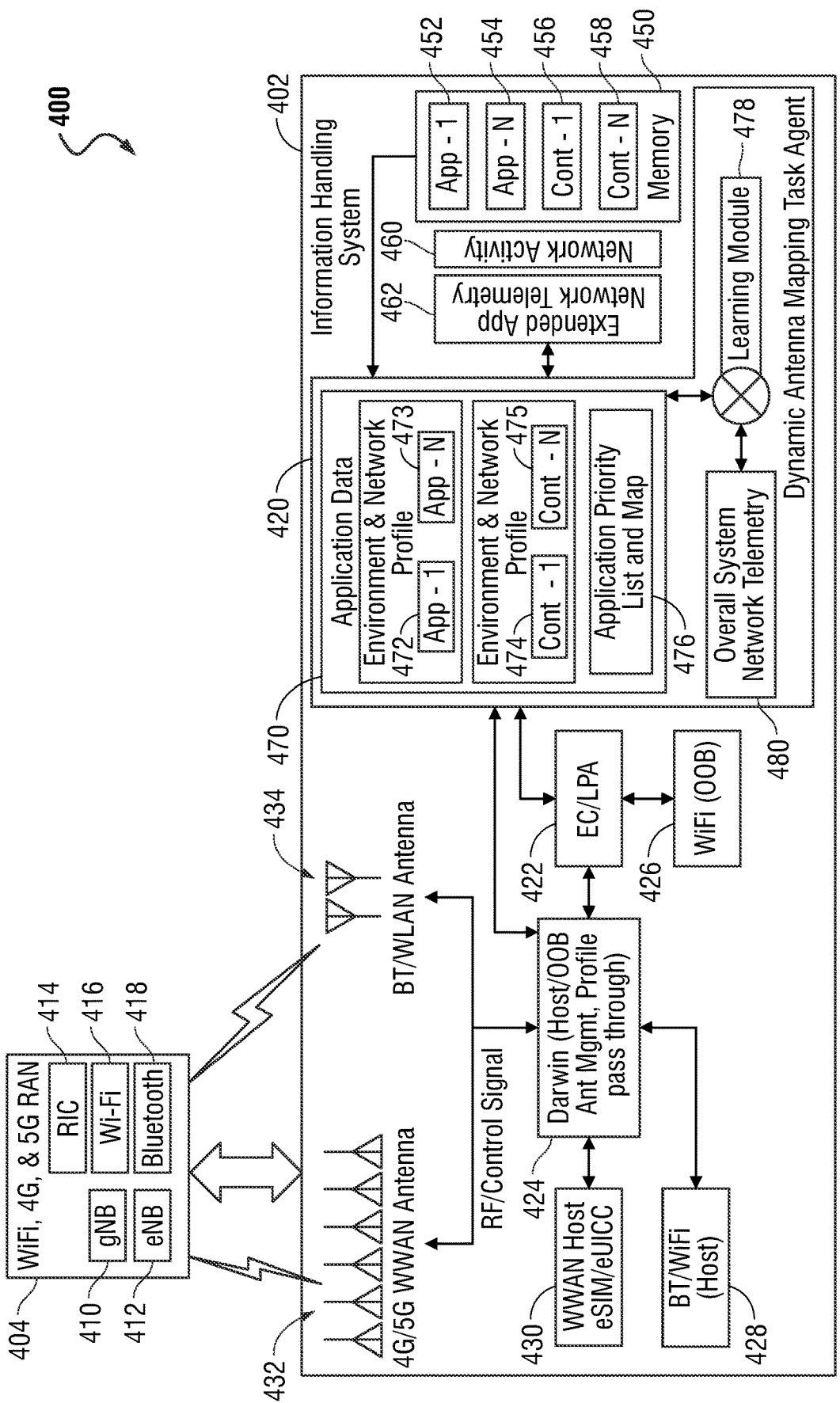
FIG. 4 is a detailed block diagram of a system for dynamically mapping a plurality antennas to a plurality of applications within an information handling system according to another embodiment of the present disclosure.

Referring now to FIG. 4, a system for providing dynamic antenna mapping within an information handling system 400 is illustrated in an embodiment. As shown, the system 400 may include an information handling system 402 in communication with a radio access network (RAN) 404. In a particular embodiment, the information handling system 402 depicted in FIG. 4 may include some of the same components of the information handling systems 100, 300 shown in the embodiments of FIG. 1 and FIG. 3 and vice versa. Further, the RAN 404 may include a Wi-Fi RAN, a 4G RAN, a 5G RAN, or a combination thereof.

Still referring to FIG. 4, the RAN 404 of the remote, transitive bootstrapping system 400 may include a next generation node b (gNB) base station 410 that may provide wireless connectivity to a 5G radio network in an embodiment. The RAN 404 may also include an evolved node b (eNB) 412 which may serve as the base station for an evolved universal mobile telecommunications system (UMTS) terrestrial radio access (E-UTRAN) in an embodiment. As shown, the RAN 404 may also include a RAN intelligent controller (MC) 414. The MC 414 may be responsible for the operation of the RAN 404 and may be responsible for optimization procedures. For example, these optimization procedures may include radio connection management, mobility management, QoS management, edge services, interference management, radio resource management, higher layer procedure optimization, policy optimization in RAN, and providing guidance, parameters, policies and AI/ML models to support the network operation. In a particular embodiment, the MC 414 may be a non-real-time MC, a near-real-time RIC, or a combination thereof. In a particular embodiment, the non-real-time MC may support tasks that utilize greater than one second (1 sec) latency and the near-real-time MC may support tasks that utilize a latency of less than one second (1 sec). The non-real-time MC may be located at a remotely located processor and conduct tasks that do not require low latency. The near-real-time MC may operate at a base station or on processing nearby and conduct tasks that require low latency. For example, non-real-time task may include service and policy management, RAN analytics, and model-training for the near-real-time RIC. A MC may be distributed in such circumstances or may in other embodiments be a single controller or set of controllers co-located FIG. 4 also indicates that the RAN 404 may include a Wi-Fi link 416 and a Bluetooth link 418.

FIG. 4 further shows that the information handling system 402 may include a dynamic antenna mapping task agent 420. The dynamic antenna mapping task agent 420 will be described in greater detail below. As shown, the information handling system 402 may include an embedded controller/local profile assistant (EC/LPA) module 422 and the EC/LPA module 422 may be coupled to the dynamic antenna mapping task agent 420. The information handling system 402 may include a dynamic antenna re-configuration wireless integration (DARWIN) module 424. As shown, the DARWIN module 424 may be connected to the EC/LPA module 422 and the dynamic antenna mapping task agent 420. During operation of the information handling system 402, the DARWIN module 424 may collect real-time operational data associated with one or more antennas connected to the DARWIN module 424 and send that real-time operational data to the dynamic antenna mapping task agent 420. In conjunction with other real-time operational data, the dynamic antenna mapping task agent 420 can optimize the mapping of one or more applications and containers to one or more antennas, modems, or other wireless connections at the information handling system 402.

The information handling system 402 may also include a Wi-Fi module 426 and the Wi-Fi module 426 may be coupled to the EC/LPA module 422. In particular, the Wi-Fi module 426 may be an out-of-band (OOB) Wi-Fi module. A Bluetooth (BT)/Wi-Fi module 428 may be connected to the DARWIN module 424. The BT/Wi-Fi module 428 may act as a host for an untrusted (new) information handling system (not shown in FIG. 4) that may use the trusted and authorized information handling system 404 as a bootstrapping bridge, as described in greater detail below. The trusted and authorized information handling system 404 may further include a WWAN module 430. The WWAN module 430 may be coupled to the Darwin module 424. The WWAN module 430 may be used by one or more applications or containers, described below. As illustrated in FIG. 4, the information handling system 402 may include a plurality of WWAN antennas 432. The WWAN antennas 432 may be 4G antennas, 5G antennas, or a combination thereof. Further, the information handling system 402 may include a plurality of WLAN antennas 434. In particular, the WLAN antennas 434 may be Bluetooth WLAN antennas.

FIG. 4 shows that the information handling system 402 may further include a memory 450. A first application 452 may be stored in the memory 450 of the information handling system 402. Further, an Nth application 454 may be stored in the memory 450 of the information handling system 402. It is to be understood that the Nth application 454 within the memory 450 of the information handling system 402 is an indication that the information handling system 402 may include any number of applications within the memory 450 in various embodiments. It is also to be understood that the first application 452 and the Nth application 454 may be computer programs, i.e., software, that may include an executable set of code instructions that may be used to receive data input, manipulate the data, and output a result. Moreover, the first application 452 and the Nth application 454 may allow a user to interact with the information handling system 402 and the hardware therein. Further, the first application 452 and the Nth application 454 may allow one or more users of the information handling system 402 to perform various tasks with the information handling system 402. Examples of applications include, but are not limited to, antivirus programs, audio players, chat software, communication software, database management programs, email programs, games, HTML editing software, Internet browsers, messaging software, photo editing software, presentation software, programming language, simulators, spreadsheet programs, video editing software, video players, and word processing software.

FIG. 4 also shows that the information handling system 402 may include a first container 456 within the memory 450. Moreover, the information handling system 402 may include an Nth container 458. It is to be understood that the Nth container 458 within the memory 450 of the information handling system 402 is an indication that the information handling system 402 may include any number of containers within the memory 450. It is to be understood that the first container 456 and the Nth container 458 may be modular units into which a subset of applications that may include the first application 452 or the Nth application 454 or other applications and the system level configuration and environment of the subset of applications may be encapsulated to execute in coordination. In an embodiment, the containers 456, 458 may be designated with a subset of a plurality of applications that are understood to have concurrent or symbiotic functions that may be coordinated, share date, be dependent on one other, or share configurations and environments withing the information handling system 402. The first container 456 and the Nth container 458 may have a dedicated filesystem (not shown) within the memory 450. During operation of the information handling system 402 real-time operational data from the first application 452, the Nth application 454, the first container 456, or the Nth container 458 within the memory 450 of the information handling system 402 may be input to the dynamic antenna mapping task manager 420 in embodiments herein. The dynamic antenna mapping task manager 420 may also receive network activity 460 related to the first application 452, the Nth application 454, the first container 456, and the Nth container 458 that may be stored within the memory 450 of the information handling system 402. Further, as shown, the dynamic antenna mapping task manager 420 may also receive extended application network telemetry 462 related to the first application 452, the Nth application 454, the first container 456, or the Nth container 458 that may be stored within the memory 450 of the information handling system 402.

As further illustrated in FIG. 4, the dynamic antenna mapping task agent 420 within the information handling system 402 may include application data 470. The application data 470 may be related to the first application 452 and the Nth application 454 stored in the memory 450 of the information handling system 402. The application data 470 may also be related to the first container 456 and the Nth container 458 stored in the memory 450 of the information handling system 402. In particular, the application data 470 may include a first application environment and network profile 472 that may be associated with the first application 452 that may be stored within the memory 450 of the information handling system 402. The first application environment and network profile 472 may include one or more attributes associated with the first application 452. These attributes may include cadence, throughput, state, associations, timestamps, or a combination thereof. The cadence may be the timespan over which the first application 452 repeats a request for data. The throughput may be the amount of data passing to the first application 452. The state may indicate whether the first application 452 is active, passive, sleeping, or in a deep sleep. The association of the first application 452 may indicate the particular network connection, e.g., antenna, Wi-Fi adapter, Bluetooth adapter, or combination thereof, that the first application uses most frequently. The timestamps may indicate a particular time and date that the first application 452 accessed an asset such as a wireless network connection. Examples of wireless connections may include the WWAN antennas 432, the WLAN antennas 434, or a combination thereof depicted in the information handling system 402 of FIG. 4

The application data 470 may also include an Nth application environment and network profile 473 that may be associated with the Nth application 454 that may be stored within the memory 450 of the information handling system 402. The Nth application environment and network profile 473 may include one or more attributes associated with the Nth application 454. These attributes may include cadence, throughput, state, associations, timestamps, or a combination thereof. The cadence may be the timespan over which the Nth application 454 repeats a request for data. The throughput may be the amount of data passing to the Nth application 454. The state may indicate whether the Nth application 454 is active, passive, sleeping, or in a deep sleep. The association of the Nth application 454 may indicate the particular network connection, e.g., antenna, Wi-Fi adapter, Bluetooth adapter, or combination thereof, that the Nth application 454 uses most frequently. The timestamps may indicate a particular time and date that the Nth application 454 accessed an asset such as a wireless network connection. Examples of wireless connections may include the WWAN antennas 432, the WLAN antennas 434, or a combination thereof depicted in the information handling system 402 of FIG. 4

In an embodiment, the application data 470 may include a first container environment and network profile 474 that may be associated with the first container 456 that may be stored within the memory 450 of the information handling system 402. The first container environment and network profile 474 may include one or more attributes associated with the first container 456. These attributes may include cadence, throughput, state, associations, timestamps, or a combination thereof. The cadence may be the timespan over which the first container 456 repeats a request for data. The throughput may be the amount of data passing to the first container 456. The state may indicate whether the first container 456 is active, passive, sleeping, or in a deep sleep. The association of the first container 456 may indicate the particular network connection, e.g., antenna, Wi-Fi adapter, Bluetooth adapter, or combination thereof, that the first container uses most frequently. The timestamps may indicate a particular time and date that the first container 456 accessed an asset such as a wireless network connection. Examples of wireless connections may include the WWAN antennas 432, the WLAN antennas 434, or a combination thereof depicted in the information handling system 402 of FIG. 4

The application data 470 may also include an Nth container environment and network profile 475 that may be associated with the Nth container 458 that may be stored within the memory 450 of the information handling system 402. The Nth container environment and network profile 475 may include one or more attributes associated with the Nth container 458. These attributes may include cadence, throughput, state, associations, timestamps, or a combination thereof. The cadence may be the timespan over which the Nth container 458 repeats a request for data. The throughput may be the amount of data passing to the Nth container 458. The state may indicate whether the Nth container 458 is active, passive, sleeping, or in a deep sleep. The association of the Nth container 458 may indicate the particular network connection, e.g., antenna, Wi-Fi adapter, Bluetooth adapter, or combination thereof, that the Nth container 458 uses most frequently. The timestamps may indicate a particular time and date that the Nth container 458 accessed an asset such as a wireless network connection. Examples of wireless connections may include the WWAN antennas 432, the WLAN antennas 434, or a combination thereof depicted in the information handling system 402 of FIG. 4

The dynamic antenna mapping task agent 420 within the information handling system 402 may use the first application environment and network profile 472 for the first application 452 and the Nth application environment and network profile 473 for the Nth application 454 to create an application priority list and map 476. The application priority list and map 476 may outline which applications or containers get priority to a particular wireless connection. For example, a browser application may have priority to a Wi-Fi adapter over a word processing application that may occasionally report metrics back to the manufacturer of the work processing application if the user has opted into sending such reports. The application priority list and map 476 may also include a map of which applications or containers are to be connected to which wireless connections for optimal performance of the information handling system 402.

FIG. 4 further indicates that the dynamic antenna mapping task agent 420 within the information handling system may include a learning module 478. The learning module 478 may receive the application data 470, e.g., the first application environment and network profile 472, the Nth application environment and network profile 473, the first container environment and network profile 474, or the Nth container environment and network profile 475. The learning module 478 within the dynamic antenna mapping task agent 420 may also receive the application priority list and map 476. Additionally, the learning module 478 may receive overall system network telemetry 480. The overall system network telemetry 480 may be transmitted from the RAN 404 to the dynamic antenna mapping task agent 420 and may include data relevant to the RAN 404, e.g., location attributes, network traffic, capacity, signal strength, etc. As described in greater detail below, the dynamic antenna mapping task agent 420 may use the learning module 476 to analyze the application data 470 (i.e., the first application environment, network profile 472 and the Nth application environment and network profile 473, the first container environment and network profile 474, or the Nth container environment and network profile 475), the application priority list and map 476 and the overall system network telemetry 480 to predict when there may be network issues, e.g., due to high traffic, congestion, etc., and preemptively adjust the radio and antenna settings for the first application 452 and the Nth application within the information handling system 402 based on the predicted network issues or the predicted usage of the first application 452 or the Nth application 454 within the information handling system 402.

Figure 5:
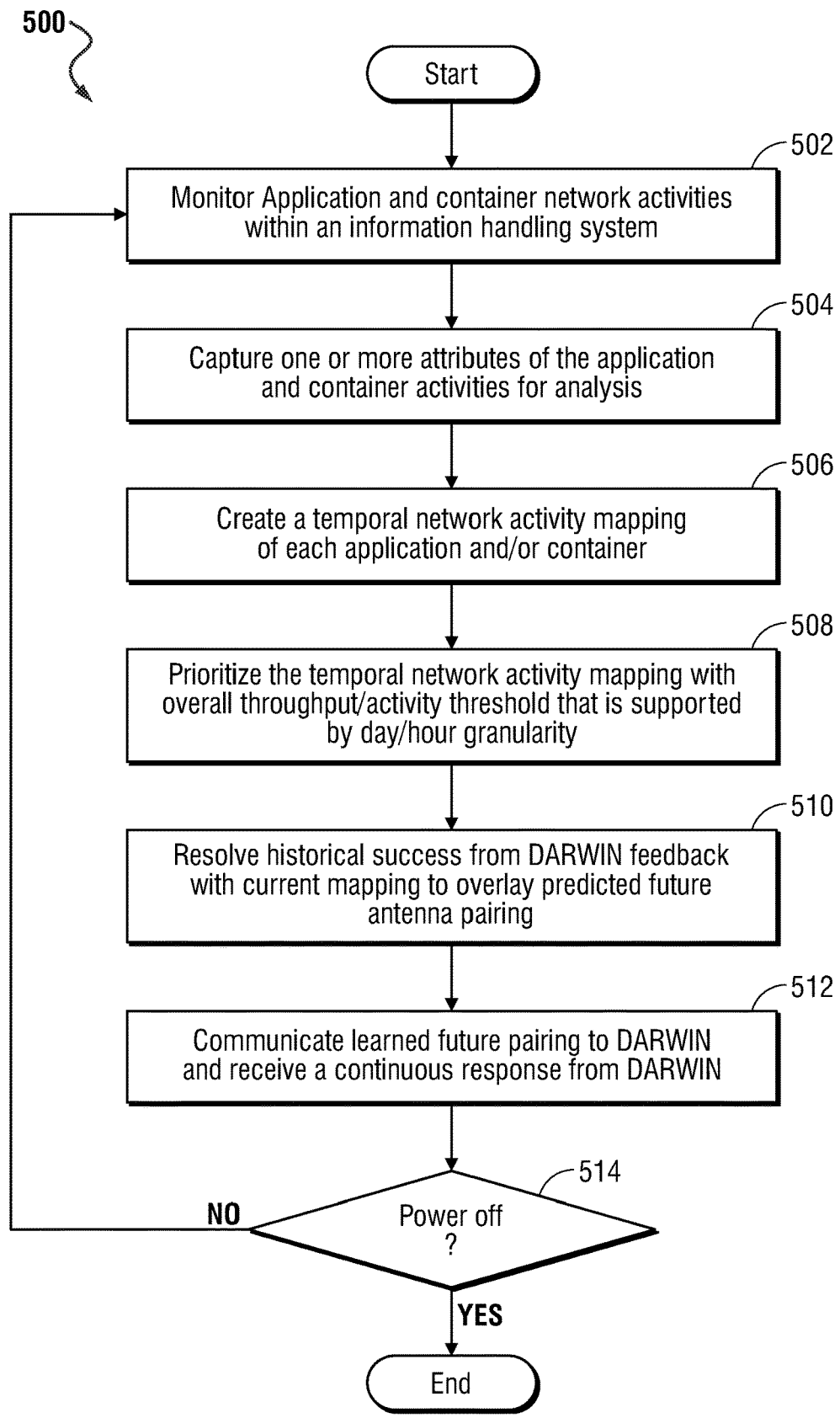
FIG. 5 is a flow diagram illustrating a method of dynamically mapping a plurality of antennas to a plurality of applications within an information handling system according to an embodiment of the present disclosure.

Referring now to FIG. 5, a method of dynamically mapping a plurality of antennas to a plurality of applications within an information handling system is illustrated and is generally designated 500 according to an embodiment of the present disclosure. In a particular embodiment, the method 500 may be performed by a dynamic antenna mapping task agent, e.g., the dynamic antenna mapping task agent 140 shown in FIG. 1, the dynamic antenna mapping task agent 340 shown in FIG. 3, or the dynamic antenna mapping task agent 420 shown in FIG. 4. The information handling system may be the information handling system 100 illustrated in FIG. 1, the information handling system 300 illustrated in FIG. 3, or the information handling system 402 illustrated in FIG. 4.

Commencing at block 502, the method 500 may include monitoring processes in any form (e.g., application and container network activities) within an information handling system during execution of those applications and association of one more applications within a container. The application may be the first application 322, the second application 324, and the Nth application 326 shown in FIG. 3; the first application 452 and the Nth application 454 shown in FIG. 4; or a combination thereof. The container may be the first container 328, the second container 330, and the Nth container 332 shown in FIG. 3; the first container 456 and the Nth container 458 shown in FIG. 4; or a combination thereof. In a particular embodiment, the dynamic antenna mapping task agent 140, 340, 420 may monitor the applications and the applications associated with particular containers.

Returning to the description of the method 500, at block 504, the method 500 may including capturing one or more attributes of the application 322, 324, 326, 452, 454, an associated container 328, 330, 332, 4546, 458, or container 328, 330, 332, 456, 458 for analysis of network activities conducted by those applications or one or more applications within a particular container. These attributes may include cadence, throughput, state, associations, timestamps, or a combination thereof. The cadence may be the timespan over which an application 322, 324, 326, 452, 454; a container of one more associated applications 328, 330, 332, 456, 458; or a combination thereof repeats a request for data from a wireless network. The throughput may be the amount of data passing to or from a particular application 322, 324, 326, 452, 454; container of one more associated applications 328, 330, 332, 456, 458; or a combination thereof. The state may indicate whether a particular application 322, 324, 326, 452, 454; container of one more associated applications 328, 330, 332, 456, 458; or a combination thereof is active, passive, sleeping, or in a deep sleep. The association of a particular application 322, 324, 326, 452, 454 may indicate which other applications the particular application 322, 324, 326, 452, 454 is associated with withing a particular container of one or more associated applications 328, 330, 332, 456, 458. The timestamps may indicate a particular time and date that a particular application 322, 324, 326, 452, 454; container 328, 330, 332, 456, 458; or a combination thereof accessed an asset such as a wireless network connection. An example of a wireless network connection may include the first antenna 302, the second antenna 304, the WLAN adapter 306, the WWAN adapter 307, the Wi-Fi adapter 308, the Bluetooth adapter 310, or a combination thereof as illustrated in FIG. 3 within the information handling system 300 establishes a wireless link with RANs 410, 412, 416. Further, examples of wireless connections may include data about utilization of the WWAN antennas 432, the BT/WLAN antennas 434, or a combination thereof depicted in the information handling system 402 of FIG. 4.

Returning, once again, to the description of the method 500 of dynamically mapping a plurality of antennas to a plurality of applications or containerized application sets within an information handling system 100, 300, 402, at block 506, the method 500 may include creating a temporal network activity mapping of each application 322, 324, 326, 452, 454; each container 328, 330, 332, 456, 458; or a combination thereof. The temporal network activity mapping may indicate which application 322, 324, 326, 452, 454 utilized which wireless network connection and the time and duration that the wireless network connection was utilized by the application 322, 324, 326, 452, 454. Further, the temporal network activity mapping may indicate which container 328, 330, 332, 456, 458 having a plurality of associated applications utilized which wireless network connection and the time and duration that the wireless network connection was utilized by the container 328, 330, 332, 456, 458. At block 508, the method 500 may include prioritizing the temporal network activity mapping with overall throughput/activity threshold of each application 322, 324, 326, 452, 454; each container 328, 330, 332, 456, 458; or a combination thereof. The prioritized temporal network activity mapping may be supported day/hour granularity provided by the timestamp data of each application 322, 324, 326, 452, 454; each container 328, 330, 332, 456, 458; or a combination thereof to provide for particular temporal mapping for applications 322, 324, 326, 452, 454 or containers 328, 330, 332, 456, 458 of associated applications. For example, a video conferencing application may have priority over an application attempting to perform a routine update.

At block 510, the method 500 may include resolving historical success from DARWIN feedback with current mapping to overlay predicted future antennae pairing for each application 322, 324, 326, 452, 454; each container 328, 330, 332, 456, 458; or a combination thereof. The historical success may be a particular mapping in which antenna mapping resulted in little or no waiting for RAN access and high signal quality for all applications or containers of application currently being executed. Thereafter, at block 512, the method 500 may include communicating learned future pairing to a DARWIN module 312, 424 and receive a continuous response, i.e., feedback, from the DARWIN module 312, 424 to establish a closed communication loop. The continuous communication with the DARWIN module 312 and the continuous reception of operational data from the DARWIN module, the applications 322, 324, 326, 452, 454; or the containers 328, 330, 332 of associated applications may allow the dynamic antenna mapping of the applications 322, 324, 326, 452, 454 or containers 328, 330, 332 456, 458 of associated applications to particular antenna or antenna sets and for use of a particular RAN. Depending on the time of day, the day of week, network demands, demands on the antennas and wireless connections, such as RAN availability or signal quality, the mapping may change dynamically and continuously. Further, past performance metrics may be used to predict future performance metrics and in turn, the predicted metrics may allow the dynamic antenna mapping task agent 140. 340, 420 to create predicted mapping between the applications 322, 324, 326, 452, 454 or containers 328, 330, 332 456, 458 of associated applications and the antennas/adapters 302, 304, 306, 307 308, 310, 432, 434, within the information handling systems 100, 300, 402. After block 512, the method 500 may proceed to decision 514.

At decision 514, the method 500 may determine if the power is turned off at the information handling system 100, 300, 402 in which the method 500 is operating. If the power is turned off, the method 500 may end. Conversely, at decision 514, if the power is not turned off, i.e., the power remains on, the method 500 may return to block 502 and the method 500 may continue as described above by repeating steps 502 through 512 until the power is turned off.

Figure 6:
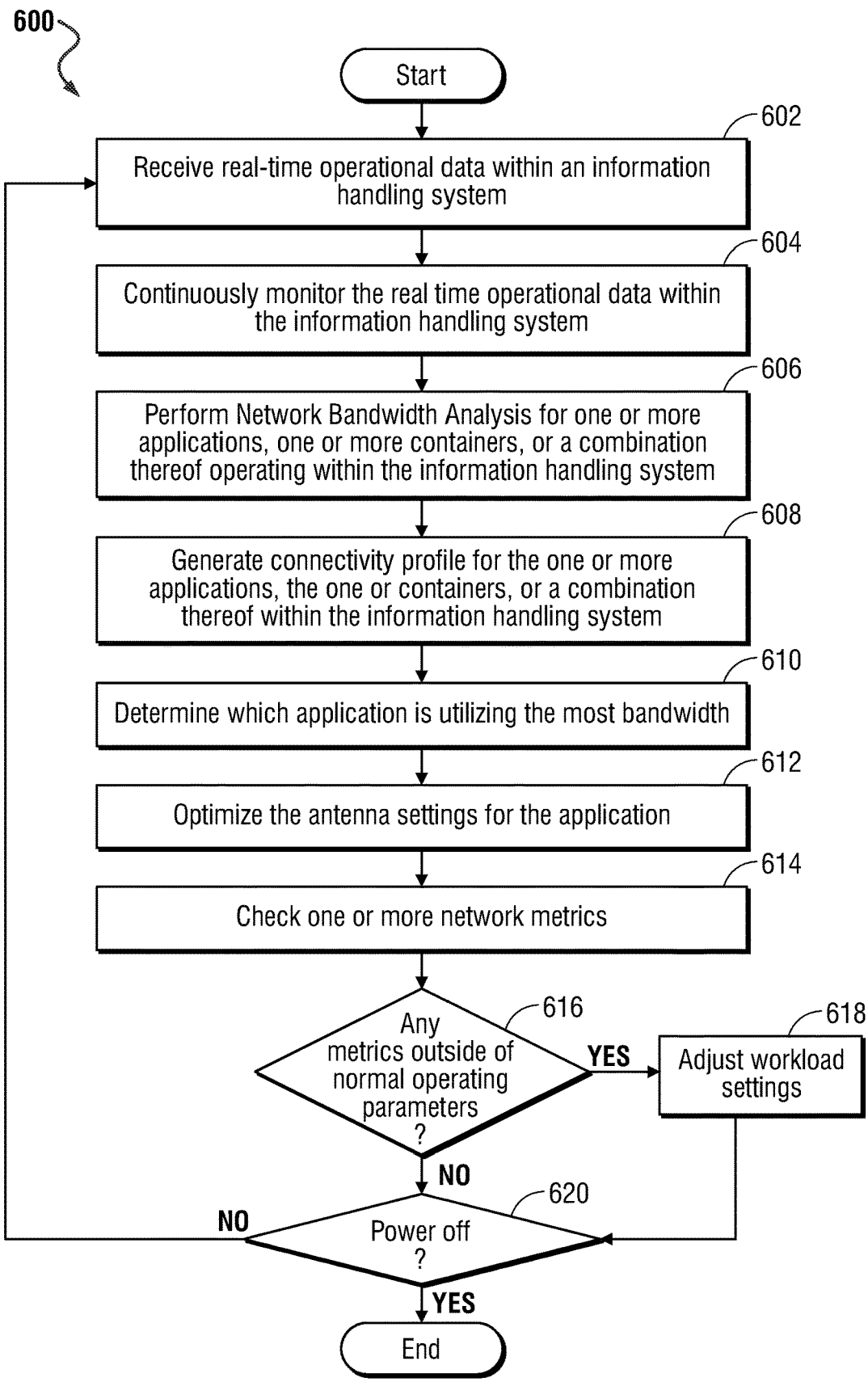
FIG. 6 is a flow diagram illustrating a method of dynamically mapping a plurality of antennas to a plurality of applications within an information handling system according to another embodiment of the present disclosure.

FIG. 6 depicts another method 600 of dynamically mapping a plurality of antennas to a plurality of applications or containers of applications within an information handling system according to an embodiment of the disclosure. The method 600 may be performed by a dynamic antenna mapping task agent, e.g., the dynamic antenna mapping task agent 140 shown in FIG. 1, the dynamic antenna mapping task agent 340 shown in FIG. 3, or the dynamic antenna mapping task agent 420 shown in FIG. 4. The information handling system may be the information handling system 100 illustrated in FIG. 1, the information handling system 300 illustrated in FIG. 3, or the information handling system 402 illustrated in FIG. 4.

Commencing at block 602, the method 600 may include receiving real time operational data within an information handling system 100, 300, 402. The real time operational data may be received within the dynamic antenna mapping task agent 140, 340, 420. The real time operational data may include cadence, throughput, state, associations, timestamps, or a combination thereof. The cadence may be the timespan over which an application 322, 324, 326, 452, 454; a container 328, 330, 332, 456, 458; or a combination thereof repeats a request for data. The throughput may be the amount of data passing to or from a particular application 322, 324, 326, 452, 454; container 328, 330, 332, 456, 458; or a combination thereof. The state may indicate whether a particular application 322, 324, 326, 452, 454; container 328, 330, 332, 456, 458; or a combination thereof is active, passive, sleeping, or in a deep sleep. The association of a particular application 322, 324, 326, 452, 454; container 328, 330, 332, 456, 458; or a combination thereof may indicate the particular network connection, e.g., antenna, Wi-Fi adapter, Bluetooth adapter, or combination thereof, that the particular application 322, 324, 326, 452, 454; container 328, 330, 332, 456, 458; or a combination thereof uses most frequently. The timestamps may indicate a particular time and date that a particular application 322, 324, 326, 452, 454; container 328, 330, 332, 456, 458; or a combination thereof accessed an asset such as a wireless network connection. The real time operational data may also include Wi-Fi telemetry, e.g., from the Wi-Fi modem 344 shown in FIG. 3, that may include download speed, upload speed, signal strength, traffic, etc. Also, the real time-operational data may include real-time operational data from the RAN, e.g., from the RAN 346 shown in FIG. 3 or the RAN 404 shown in FIG. 4. That data can include a RAN heatmap. The RAN heatmap may include information concerning the demand for usage at one or more RANs 346 available to an information handling system. In addition, the RAN heatmap may include wireless availability and signal strength at particular locations.

Returning to the description of FIG. 6, at block 604, the method 600 may include continuously monitoring the received real time operational data within the information handling system 100, 300, 402, e.g., at the dynamic antenna mapping task agent 140, 340, 420. At block 606, the method 600 may include performing a network bandwidth analysis for one or more applications 322, 324, 326, 452, 454, one or more containers 328, 330, 332, 456, 458, or a combination thereof operating within the information handling system 100, 300, 402. The network bandwidth analysis may determine what wireless connection or antenna each of the one or more applications 322, 324, 326, 452, 454, one or more containers 328, 330, 332, 456, 458, or a combination thereof operating within the information handling system 100, 300, 402 is using, how much bandwidth they are utilizing, and what requirements will they require as they continue to operate.

At block 608, the method 600 may include generating a connectivity profile for the one or more applications 322, 324, 326, 452, 454, one or more containers 328, 330, 332, 456, 458, or a combination thereof operating within the information handling system 100, 300, 402. within the information handling system 100, 300, 402. The connectivity profile is generated based on the analysis performed above a block 606. Moving to block 610, the method 600 may include determining which of the applications 322, 324, 326, 452, 454 or containers 328, 330, 332, 456, 458 is utilizing the most bandwidth based on the connectivity profile. At block 612, the method 600 may include optimizing the antenna settings for the application that is using the highest bandwidth. The settings may include a map between the one or more applications 322, 324, 326, 452, 454, one or more containers 328, 330, 332, 456, 458, or a combination thereof to the wireless connection points, or antennas, within the information handling system 100, 300, 402. At block 614, the method 600 may then include checking one or more network metrics 614. For example, the network metrics may include location attributes, network traffic, capacity, and signal strength.

Moving to decision 616, the method 600 may include determining whether any metrics are outside of normal operating parameters. If any of the metrics are outside of normal operating parameters, the method 600 may proceed to block 618. At block 618, the method 600 may include adjusting one or more workload settings of the applications 322, 324, 326, 452, 454 or containers 328, 330, 332, 456, 458 of applications. For example, the method 600 may include changing the mapping between the one or more applications 322, 324, 326, 452, 454, one or more containers 328, 330, 332, 456, 458 of applications, or a combination thereof to the wireless connection points, or antennas, within the information handling system 100, 300, 402. For some applications 322, 324, 326, 452, 454 or containers 328, 330, 332, 456, 458 of applications adjustments may be made to the applications 322, 324, 326, 452, 454 or containers 328, 330, 332, 456, 458 of applications based on wireless data access priorities (background, streaming, active communications, etc.) to adjust applications 322, 324, 326, 452, 454 or containers 328, 330, 332, 456, 458 of applications workloads to accommodate assigned wireless links and RAN type and capability or condition. Thereafter, the method 618 may proceed to decision 620. Returning to decision 616, if none of the metrics are outside of normal operating parameters, the method 600 may also proceed to decision 620. At decision 620, the method 600 may determine if the power is turned off at the information handling system 100, 300, 402 in which the method 600 is operating. If the power is turned off, the method 600 may end. Conversely, at decision 620, if the power is not turned off, i.e., the power remains on, the method 600 may return to block 602 and the method 600 may continue as described above by repeating steps 602 through 620 until the power is turned off.

Referring now to FIG. 7A through FIG. 7E, yet another method 700 of dynamically mapping a plurality of antennas to a plurality of applications and containers of applications within an information handling system is illustrated according to embodiments of the present disclosure. The method 700 may be performed by a dynamic antenna mapping task agent, e.g., the dynamic antenna mapping task agent 140 shown in FIG. 1, the dynamic antenna mapping task agent 340 shown in FIG. 3, or the dynamic antenna mapping task agent 420 shown in FIG. 4. The information handling system may be the information handling system 100 illustrated in FIG. 1, the information handling system 300 illustrated in FIG. 3, or the information handling system 402 illustrated in FIG. 4.

Beginning at block 702, the method 700 may include commencing an algorithmic method in which when power is supplied to the information handling system 100, 300, 402, i.e., the information handling system 100, 300, 402 is powered on, one or more of steps 704 through 788 may be performed as described below. At block 704, the method 700 may include receiving real-time operational data from a first application 322, 452 running within the information handling system 100, 300, 402 according to various embodiments. For example, the real-time operational data from the first application 322, 452 may be received at the dynamic antenna mapping task agent 140, 340, 420 within the information handling system 100, 300, 402. At block 706, the method 700 may include monitoring the real-time operational data from the first application 322, 452 running within the information handling system 100, 300, 402. For example, the real-time operational data from the first application 322, 452 may be monitored at the dynamic antenna mapping task agent 140, 340, 420 within the information handling system 100, 300, 402.

Moving to block 708, the method 700 may include receiving real-time operational data from a second application 324 running within the information handling system 100, 300, 402. For example, the real-time operational data from the second application 324 may be received at the dynamic antenna mapping task agent 140, 340, 420 within the information handling system 100, 300, 402. At block 710, the method 700 may include monitoring the real-time operational data from the second application 324 running within the information handling system 100, 300, 402. For example, the real-time operational data from the second application 324 may be monitored at the dynamic antenna mapping task agent 140, 340, 420 within the information handling system 100, 300, 402.

At block 712, the method 700 may include receiving real-time operational data from an Nth application 326, 456 running within the information handling system 100, 300, 402. For example, the real-time operational data from the second application 324 may be received at the dynamic antenna mapping task agent 140, 340, 420 within the information handling system 100, 300, 402. Thereafter, at block 714, the method 700 may include monitoring the real-time operational data from the Nth application 326, 456 running within the information handling system 100, 300, 402. For example, the real-time operational data from the Nth application 326, 456 may be monitored at the dynamic antenna mapping task agent 140, 340, 420 within the information handling system 100, 300, 402.

Proceeding to block 716, the method 700 may include receiving real-time operational data from a first container 328, 456 of a plurality of applications running within the information handling system 100, 300, 402. For example, the real-time operational data from the first container 328, 456 may be received at the dynamic antenna mapping task agent 140, 340, 420 within the information handling system 100, 300, 402. At block 718, the method 700 may include monitoring the real-time operational data from the first container 328, 456 running within the information handling system 100, 300, 402. For example, the real-time operational data from the first container 328, 456 may be monitored at the dynamic antenna mapping task agent 140, 340, 420 within the information handling system 100, 300, 402.

Next, at block 720, the method 700 may include receiving real-time operational data from a second container 330 of a plurality of applications running within the information handling system 100, 300, 402. For example, the real-time operational data from the second container 330 may be received at the dynamic antenna mapping task agent 140, 340, 420 within the information handling system 100, 300, 402. Further, at block 722, the method 700 may include monitoring the real-time operational data from the second container 330 running within the information handling system 100, 300, 402. For example, the real-time operational data from the second container 330 may be monitored at the dynamic antenna mapping task agent 140, 340, 420 within the information handling system 100, 300, 402.

Figure 7A:
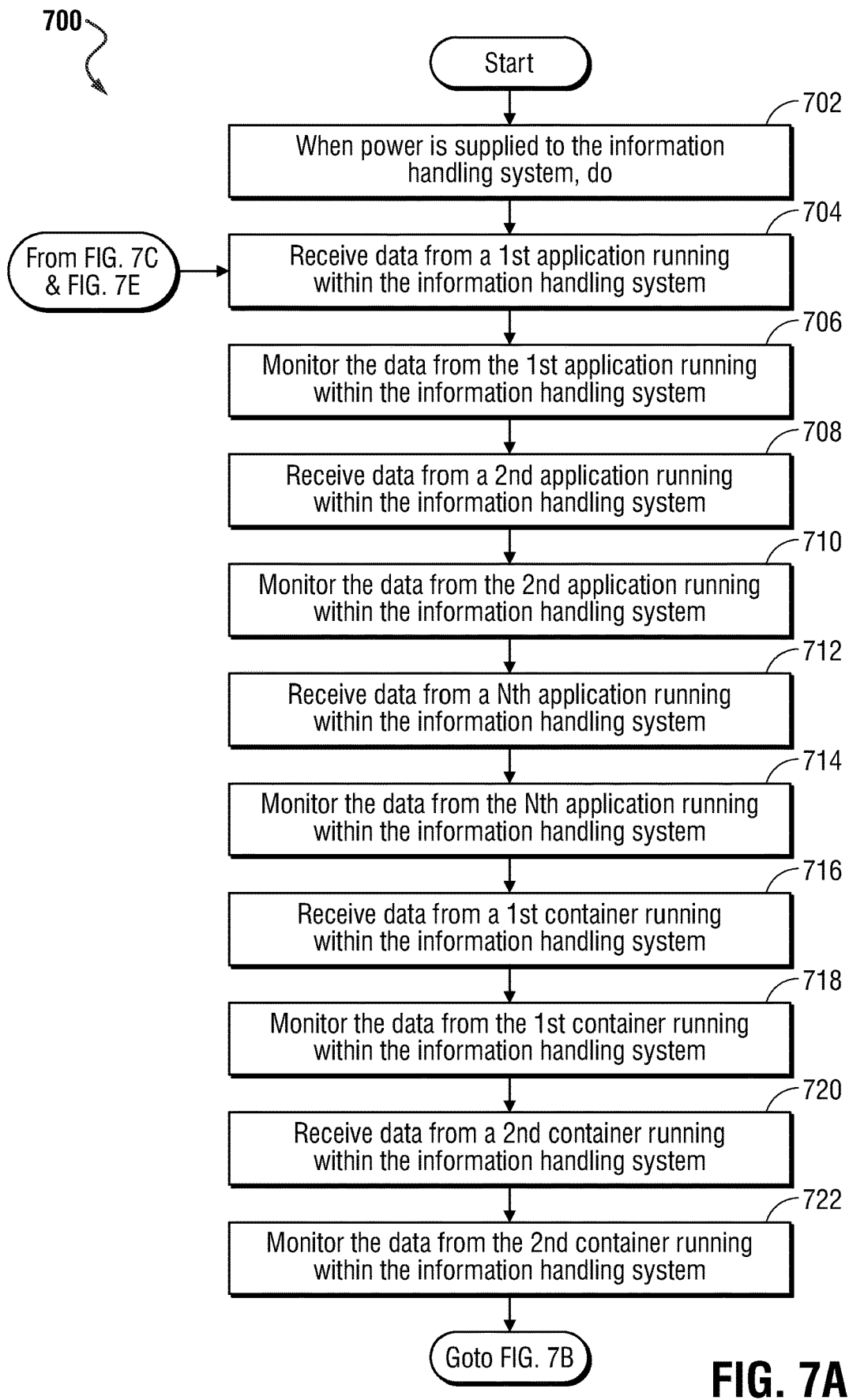
FIG. 7A through FIG. 7E are flow diagrams illustrating a method of dynamically mapping a plurality of antennas to a plurality of applications within an information handling system according to yet another embodiment of the present disclosure.
Figure 7B:
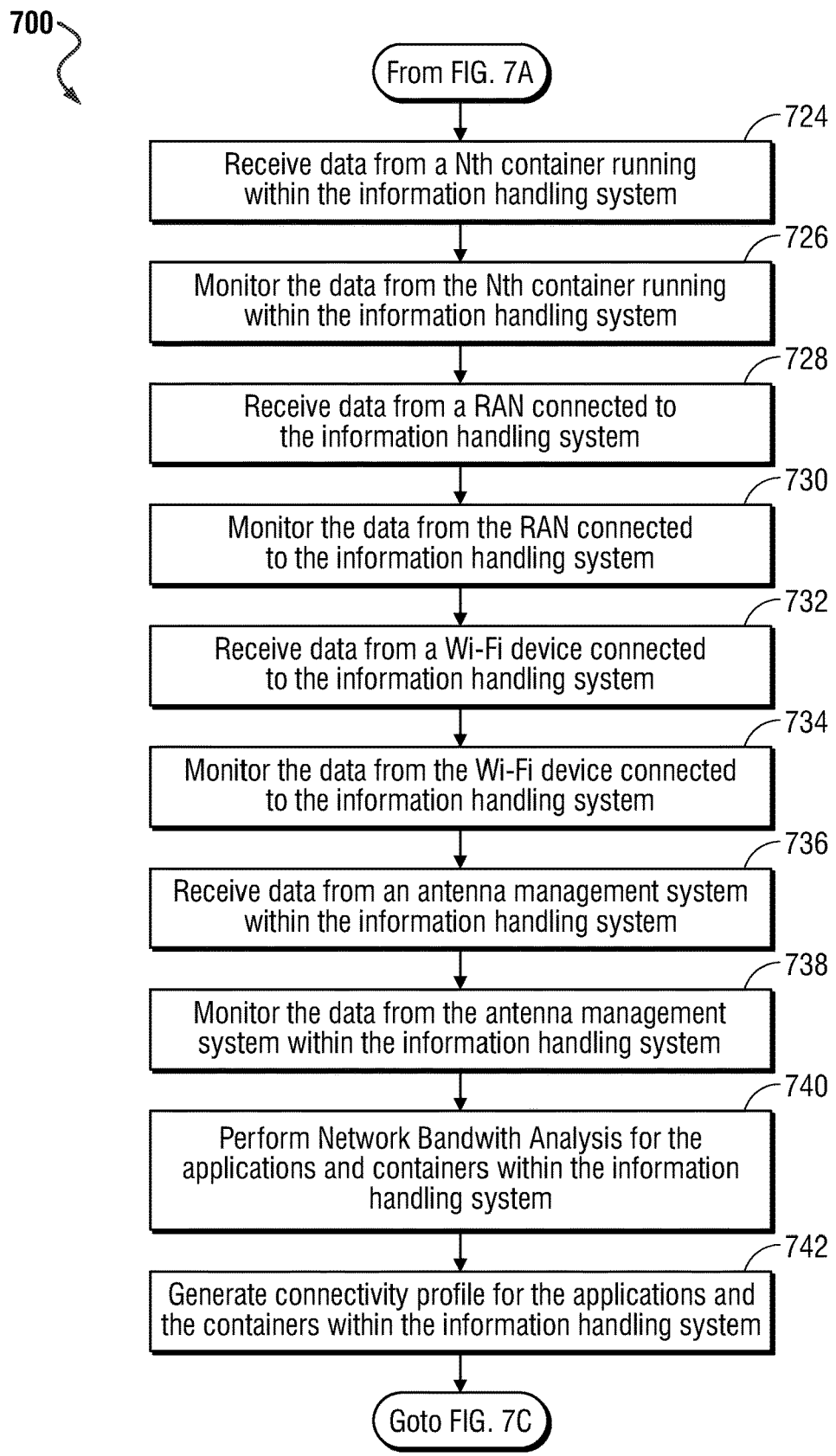

Continuing to block 724 of FIG. 7B, the method 700 may include receiving real-time operational data from an Nth container 332, 458 of a plurality of applications running within the information handling system 100, 300, 402. For example, the real-time operational data from the Nth container 332, 458 may be received at the dynamic antenna mapping task agent 140, 340, 420 within the information handling system 100, 300, 402. At block 726, the method 700 may include monitoring the real-time operational data from the Nth container 332, 458 running within the information handling system 100, 300, 402 For example, the real-time operational data from the Nth container 332, 458 may be monitored at the dynamic antenna mapping task agent 140, 340, 420 within the information handling system 100, 300, 402.

At block 728, the method 700 may include receiving real-time operational data from a RAN 346, 404 connected to the information handling system 100, 300, 402. For example, the real-time operational data from the RAN 346, 404 may include, but is not limited to, RAN network traffic, data bandwidth, congestion, resource, and configuration. For example, the real-time operational data from the RAN 346, 404 may be received at the dynamic antenna mapping task agent 140, 340, 420 within the information handling system 100, 300, 402. At block 730, the method 700 may include monitoring the real-time operational data from the RAN 346, 404 connected to the information handling system 100, 300, 402. For example, the real-time operational data from the RAN 346, 404 may be monitored at the dynamic antenna mapping task agent 140, 340, 420 within the information handling system 100, 300, 402.

Proceeding to block 732, the method 700 may include receiving real-time operational data from a Wi-Fi device 344 connected to the information handling system 100, 300, 402. For example, the real-time operational data from the Wi-Fi device 344 may include, but is not limited to, Wi-Fi telemetry that may include throughput, jitter, availability, signal strength, retries, and latency. For example, the real-time operational data from the Wi-Fi device 344 may be received at the dynamic antenna mapping task agent 140, 340, 420 within the information handling system 100, 300, 402. Next, at block 734, the method 700 may include monitoring the real-time operational data from the Wi-Fi device 344 connected to the information handling system 100, 300, 402. For example, the real-time operational data from the Wi-Fi device 344 may be monitored at the dynamic antenna mapping task agent 140, 340, 420 within the information handling system 100, 300, 402.

At block 736, the method 700 may include receiving real-time operational data from an antenna management system within the information handling system 100, 300, 402. For example, the real-time operational data from the antenna management system may include, but is not limited to, signal strength, lossy medium detection, throughput, latency, and past configuration/performance. For example, the real-time operational data from the antenna management system may be received at the dynamic antenna mapping task agent 140, 340, 420 within the information handling system 100, 300, 402. Further, for example, the antenna management system may be the DARWIN module 312 within the information handling system 300 illustrated in FIG. 3 or the DARWIN module 424 within the information handling system 402 depicted in FIG. 4. Moving to block 738, the method 700 may include monitoring the real-time operational data from the antenna management system within the information handling system 100, 300, 402 For example, the real-time operational data from the antenna management system may be monitored at the dynamic antenna mapping task agent 140, 340, 420 within the information handling system 100, 300, 402.

At block 740, the method 700 may include performing a network bandwidth analysis for the applications 322, 324, 326, 452, 454 322, 324, 326, 452, 454 within the information handling system 100, 300, 402. The network bandwidth analysis may determine what wireless connection or antenna each of the one or more applications 322, 324, 326, 452, 454, one or more containers 328, 330, 332, 456, 458, or a combination thereof operating within the information handling system 100, 300, 402 is using, how much bandwidth they are utilizing, and what requirements will they require as they continue to operate. At block 742, the method 700 may include generating a connectivity profile for the applications 322, 324, 326, 452, 454 and the containers 328, 330, 332, 456, 458 within the information handling system 100, 300, 402 to suitable wireless links in the plurality of antennas for one or more 3GPP RANs or Wi-Fi. The connectivity profile for each of the applications 322, 324, 326, 452, 454 and containers 328, 330, 332, 456, 458 may be based on the network bandwidth analysis.

Figure 7C:
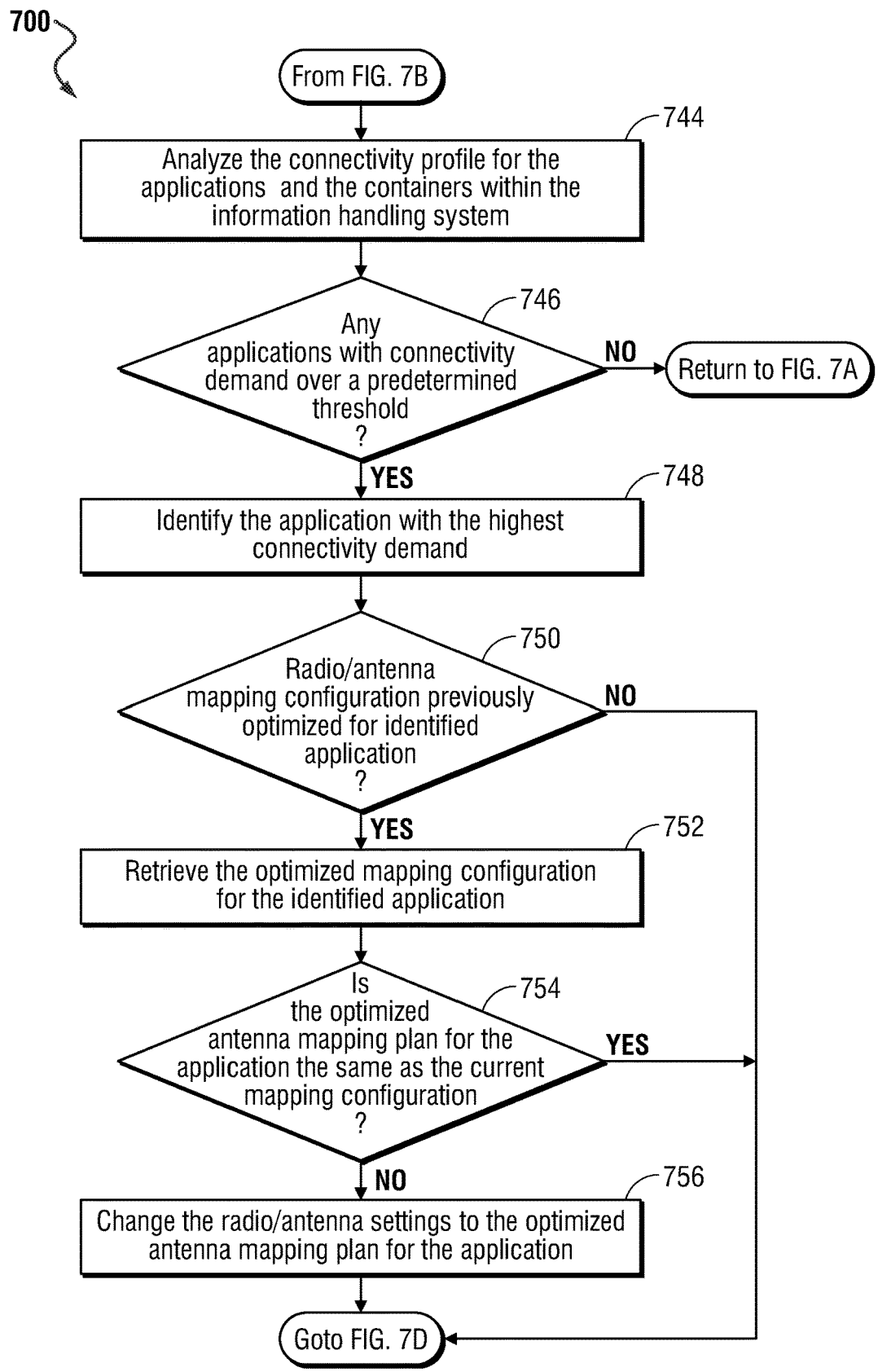
Figure 7D:
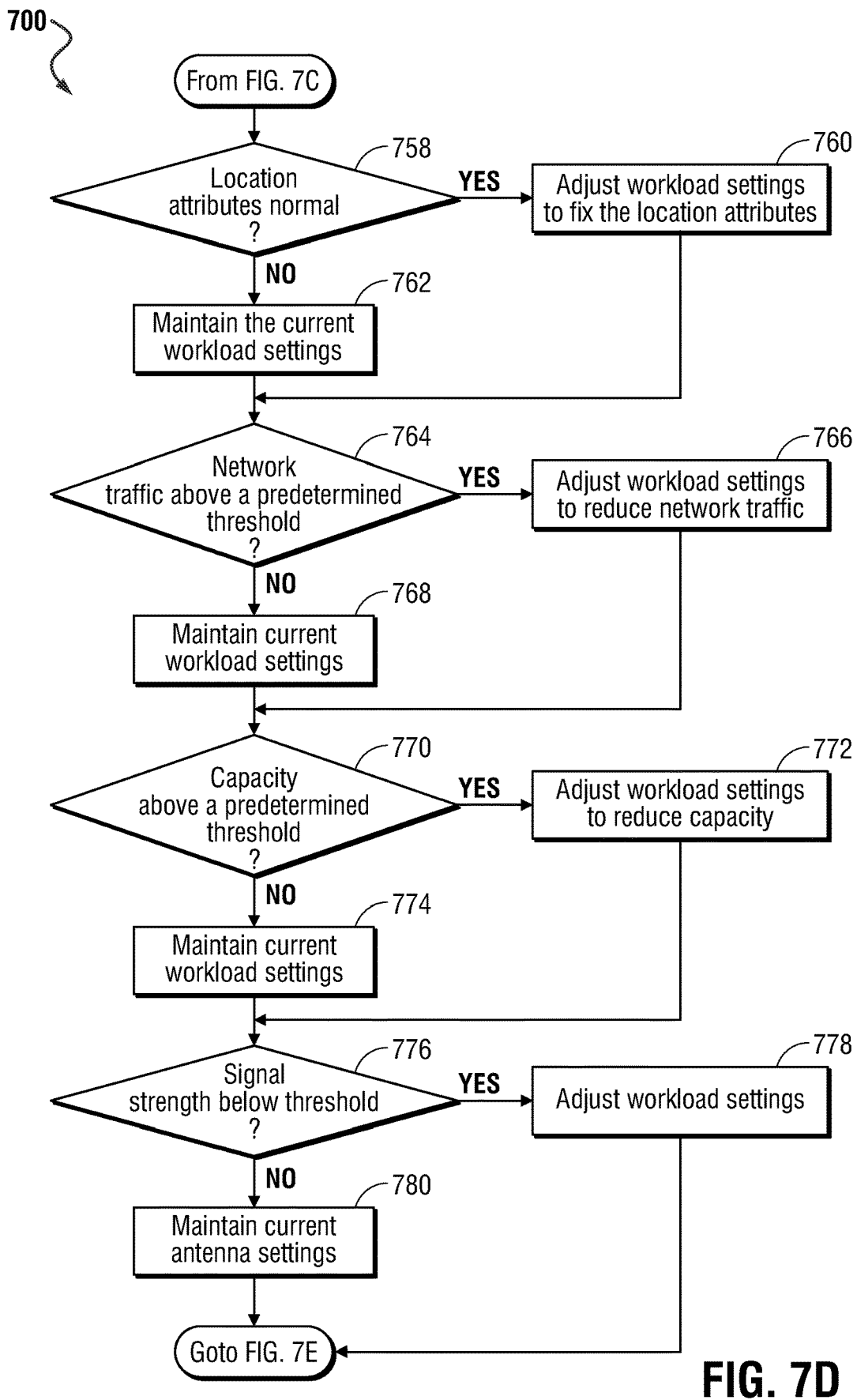

Moving to block 744 of FIG. 7C, the method 700 may analyze the connectivity profile for the applications 322, 324, 326, 452, 454 and the containers 328, 330, 332, 456, 458 of applications within the information handling system 100, 300, 402 to determine a particular antenna mapping or network demands for each application 322, 324, 326, 452, 454 or the container 328, 330, 332, 456, 458 of applications. Thereafter, at decision 746, the method 700 may include determining if there are any applications 322, 324, 326, 452, 454 with connectivity demand over a predetermined threshold. For example, this demand may be determined from the application profile and historical application network utilization. If there are no applications 322, 324, 326, 452, 454 with connectivity demand over a predetermined threshold, the method 700 may return to block 704 of FIG. 7A and the method 700 may continue as described herein to continue monitoring connectivity of applications 322, 324, 326, 452, 454 and the containers 328, 330, 332, 456, 458 of applications among a plurality of available wireless links for the information handling system. On the other hand, at decision 746 if there indeed any applications 322, 324, 326, 452, 454 with connectivity demand over a predetermined threshold, the method 700 may proceed to block 748 and the method 700 may identify the application with the highest connectivity demand. Thereafter, at decision 750, the method 700 may include determining if the radio/antenna configuration within the information management system 100, 300, 402 was previously optimized for the identified application. If the radio/antenna configuration, i.e., antenna mapping, within the information management system 100, 300, 402 was not previously optimized for the identified application, the method 700 may continue to decision 758 of FIG. 7D. On the other hand, if the radio/antenna configuration, i.e., antenna mapping, within the information management system 100, 300, 402 was previously optimized for identified application and other applications and containers of applications as (newly) prioritized, the method 700 may continue to block 752. At block 752, the method 700 may retrieve the optimized antenna mapping plan for the identified application and other applications and containers of applications as currently prioritized.

Thereafter, at decision 754, the method 700 may include determining if the optimized antenna mapping plan for the identified application and other applications and containers of applications as currently prioritized is the same as the current mapping configuration implemented. If the optimized antenna mapping plan for the identified application and other applications and containers of applications as currently prioritized is the same as the current mapping configuration implemented, the method 700 may proceed to decision 758 of FIG. 7D. Conversely, if the optimized antenna mapping plan for the identified application and other applications and containers of applications as currently prioritized is not the same as the current mapping configuration implemented, the method 700 may continue to block 756. At block 756, the method 700 may include changing the radio/antenna settings and assignments to applications and containers of applications to the optimized antenna mapping plan for the application and other applications and containers of applications as currently prioritized. Thereafter, the method 700 may move to decision 758 of FIG. 7D.

At decision 758, the method 700 may include determining, if the location attributes are normal. For example, normal may include a user behavior attribute that is learned at part of the "norm" for a specific endpoint. The location attributes may include a round trip time for a signal ping from the information handling system 100, 300, 420 to a network device, e.g., the RAN 346, 404. If the location attributes are not normal, the method 700 may proceed to block 760. At block 760, the method 700 may include adjusting one or more workload settings within the information handling system 100, 300, 402 in order to fix the location attributes or return them to normal. Adjusting the workload settings may include changing, or optimizing, the mapping between the one or more applications 322, 324, 326, 452, 454, one or more containers 328, 330, 332, 456, 458, or a combination thereof to the wireless connection points, or antennas, within the information handling system 100, 300, 402. [INVENTORS: IS THIS CORRECT FOR THE WORKLOAD SETTINGS?] On the other hand, at decision 758, if the location attributes are normal, the method 700 may proceed to block 762 and the method 700 may include maintaining the current workload settings. In other words, the mapping between the one or more applications 322, 324, 326, 452, 454, one or more containers 328, 330, 332, 456, 458, or a combination thereof to the wireless connection points, or antennas, within the information handling system 100, 300, 402 may remain unchanged. From block 760 and block 762, the method 700 may proceed to decision 764.

At decision 764, the method 700 may include determining if the network traffic is above a predetermined threshold. For example, the threshold may be a dynamic threshold that may affect performance, i.e., tolerable limits for traffic congestion, and latency. If the network traffic is indeed above a predetermined threshold, the method 700 may proceed to block 766. At block 766, the method 700 may include adjusting one or more workload settings within the information handling system 100, 300, 402 in order to reduce the network traffic. The network traffic may be received from a management application in a cloud about managed network congestion statistics or from a network provider (via contracts) for network congestion information. Adjusting the workload settings may include changing, or optimizing, the mapping between the one or more applications 322, 324, 326, 452, 454, one or more containers 328, 330, 332, 456, 458, or a combination thereof to the wireless connection points, or antennas, within the information handling system 100, 300, 402. Returning to decision 764, if the network traffic is not above a predetermined threshold, the method 700 may move to block 768. At block 768, the method 700 may include maintaining the current workload settings. In other words, the mapping between the one or more applications 322, 324, 326, 452, 454, one or more containers 328, 330, 332, 456, 458, or a combination thereof to the wireless connection points, or antennas, within the information handling system 100, 300, 402 may remain unchanged. From block 766 and block 768, the method 700 may continue to decision 770.

At decision 770, the method 700 may include determining if the capacity saturation of the network is above a predetermined threshold. If the capacity saturation of the network is indeed above the predetermined threshold, the method 700 may proceed to block 772. At block 772, the method 700 may include adjusting one or more workload settings in order to reduce the capacity saturation of the network. In a particular embodiment, adjusting the workload settings may include changing, or optimizing, the mapping between the one or more applications 322, 324, 326, 452, 454, one or more containers 328, 330, 332, 456, 458, or a combination thereof to the wireless connection points, or antennas, within the information handling system 100, 300, 402. On the other hand, at decision 770, if the capacity saturation of the network is not above the predetermined threshold, the method 700 may continue to block 774 and the method 700 may include maintaining the current workload settings. In other words, the mapping between the one or more applications 322, 324, 326, 452, 454, one or more containers 328, 330, 332, 456, 458, or a combination thereof to the wireless connection points, or antennas, within the information handling system 100, 300, 402 may remain unchanged. From block 772 or block 774, the method 700 may proceed to decision 776.

At decision 776, the method 700 may determine whether the signal strength of any wireless connection is below a predetermined threshold quality of service (QoS) level. The QoS may indicate a signal to noise ratio (SNR), RSSI, bit error rate or other QoS metrics. If the signal strength of any wireless connection is below the predetermined threshold, the method 700 may move to block 778. At block 778, the method 700 may include adjusting workload settings so the wireless connection with the weak signal is not used or not assigned to an application 322, 324, 326, 452, 454 or containers 328, 330, 332, 456, 458 that doesn't currently require a high capacity of low latency wireless connection or is intermittently using a wireless connection. In a particular embodiment, adjusting the workload settings may include changing, or optimizing, the mapping between the one or more applications 322, 324, 326, 452, 454, one or more containers 328, 330, 332, 456, 458, or a combination thereof to the wireless connection points, or antennas, within the information handling system 100, 300, 402. Returning to decision 776, if the signal strength is above the threshold QoS level, the method 700 may proceed to block 780. At block 780, the method 700 may include maintaining the current antenna settings. In other words, the mapping between the one or more applications 322, 324, 326, 452, 454, one or more containers 328, 330, 332, 456, 458, or a combination thereof to the wireless connection points, or antennas, within the information handling system 100, 300, 402 may remain unchanged. From block 778 or block 780, the method 700 may continue to block 782 of FIG. 7E.

Figure 7E:
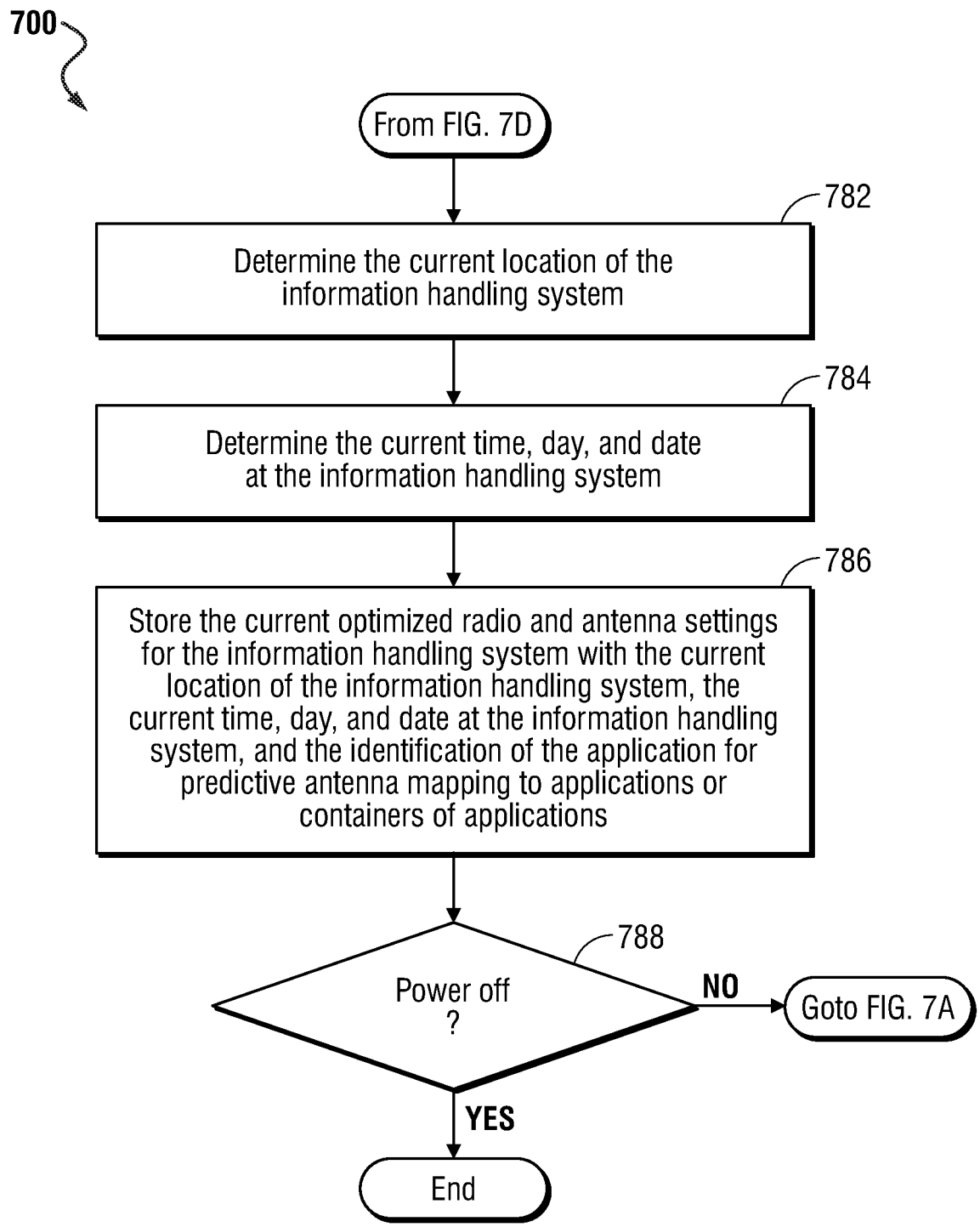

At block 782 of FIG. 7E, the method 700 may include determining the current location of the information handling system 100, 300, 402. For example, the current location of the information handling system 100, 300, 402 may be determined using a global position system (GPS) module within the information handling system 100, 300, 402. In many cases a user may use a particular information handling system 100, 300, 402 in different locations, e.g., at home, at work, at a café. For such an information handling system 100, 300, 402 having particular an optimized antenna mapping plan for various locations may substantially increase the operational efficiency of the information handling system 100, 300, 402 based on the history of operation of the information handling system and wireless systems at those locations. Moving to block 784, the method 700 may include determine the current time, day, and date at the information handling system 100, 300, 402. In certain instances, a user may use a particular information handling system 100, 300, 402 for different tasks throughout a day. For example, a user may always schedule video conferences in the morning and may play games at night. Moreover, the user may use the information handling system 100, 300 for different tasks on different days, e.g., during the work week versus during the weekend.

Accordingly, the method 700 can allow a dynamic antenna mapping task agent 340, 420 within the information handling 100, 300, 402 to learn the user habits and predict that at certain times of day, certain applications will be used. At block 786, the method 700 may include storing the current optimized radio and antenna settings, i.e., the optimized mapping, for the information handling system 100, 300, 402 with the current location of the information handling system 100, 300, 402, the current time, the current day, the current date, and the identification of the current application. Accordingly, at a later time, the dynamic antenna mapping task agent 340, 420 can retrieve an optimized antenna mapping plan for a particular application, e.g., as in block 752 of the method 700 (shown in FIG. 7C) and preemptively push the optimized antenna mapping plan to an antenna controller, e.g., a DARWIN module 312, 424, to change the antenna settings, e.g., the mapping, before a particular application is brought online for use at a particular time of day in a particular location. In an embodiment, the dynamic antenna mapping task agent 340, 420, e.g., the learning module 478 therein utilizing machine learning classifiers, artificial neural network applications, perceptron, relevance vector machine, or other artificial intelligence applications to apply machine learning, may learn from the data monitored during the execution of the method and may use that information to detect trends and predict operational issues during execution of the applications and container of applications within the information handling system. Based on the predicted operational issues, dynamic antenna mapping task agent, e.g., the learning module 478 therein, may suggest different antenna mapping schemes for the applications and containers of applications.

Moving to decision 788, the method 700 may include determining if the power to the information handling system 100, 300, 402 is powered off. At decision 788, if the power to the information handling system 100, 300, 402 is powered off, the method may end. At decision 788, if the power to the information handling system 100, 300, 402 remains on, the method 700 may return to block 704 of FIG. 7A and the method 700 may perform repeated iterations for continuous monitoring of applications and containers of applications assigned to available antennas, RANs, and Wi-Fi until the power to the information handling system 100, 300, 402 is turned off.

The blocks of the flow diagrams of FIG. 5 through FIG. 7E or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Information handling systems, modules, resources, or programs that are in communication with one another need not be in continuous communication with each other, unless expressly specified otherwise. In addition, information handling systems, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a processor, a memory, and a power management unit (PMU);
the processor executing code instructions of a dynamic antenna mapping task agent configured to generate an optimized antenna mapping plan for a plurality of applications, or containers of related applications, wherein the optimized mapping plan determines a first subset application or first container of related applications of the plurality of applications or containers of related applications, is designated to use a first antenna of a plurality of antennas and wireless connections within the information handling system while a second subset application or second container of related applications of the plurality of the applications or the containers of related applications is designated to use a second antenna of a plurality of antennas and wireless connections within the information handling system;

the processor executing code instructions of the dynamic antenna mapping task agent to:

receive real-time operational data within the information handling system;

perform a network bandwidth analysis for the first subset application or first container of related applications of the plurality of the applications or the containers of related applications and the second subset application or second container of related applications of the plurality of applications or the containers of related applications to determine wireless bandwidth used by the first subset application or first container of related applications and the second subset application or second container of related applications;

access an application priority list and map that outlines which of the plurality of applications get priority to each of a plurality of wireless connections of the plurality of antennas and includes a map that outlines how each of the plurality of applications installed within the information handling system are to be connected to the plurality of wireless connections created at least partially based on an environment and network profile with one or more attributes of the plurality of applications installed within the information handling system;

generate a connectivity profile for the first subset application or first container of related applications and the second subset application or second container of related applications of the plurality of the applications or the containers of related applications with determined wireless links being used, bandwidth of the wireless links being used, and bandwidth needs as operations continue for the plurality of applications or containers of related applications; and create the optimized antenna mapping plan for the plurality of the applications or the containers of related applications at least partially based on a bandwidth usage of the plurality of applications or containers of related applications.

2. The information handling system of claim 1, wherein the dynamic antenna mapping task agent determines if one or more network metrics is outside of normal operating parameters and changes the optimized antenna mapping plan when one or more networks is outside of normal operating parameters.

3. The information handling system of claim 2 wherein the dynamic antenna mapping task agent is continuously receiving and monitoring the real-time operational data within the information handling system while the information handling system is powered on.

4. The information handling system of claim 3, wherein the real-time operational data includes real-time operational data for the plurality of applications, or real-time operational data for the plurality of containers of related applications, as well as real-time operational data for the one or more antennas and one or more wireless connections.

5. The information handling system of claim 4, wherein the real-time operational data further includes real-time operational data from one or more radio access networks (RANs), real-time operational data from one or more Wi-Fi networks, or a combination thereof.

6. The information handling system of claim 1, wherein the optimized antenna mapping plan is generated for a particular location, a particular time of day, a particular day of the week, or a combination thereof.

7. An information handling system comprising:

a processor; a memory; and a power management unit (PMU);

the processor executing code instructions for predictive temporal mapping using one or more past time/date stamped optimized antenna mapping plans to determine a future antenna mapping plan; and the processor executing code instructions of a dynamic antenna mapping task agent configured to generate an optimized antenna mapping plan for one or more applications, one or more containers of related applications, or a combination thereof, wherein the optimized mapping plan determines a first application or a first container of related applications of the plurality of applications or containers of related applications is determined to use a first antenna and a first wireless connection of a plurality of antennas within the information handling system and a second application or a second container of related applications of the plurality of applications or containers of related applications is determined to use a second antenna and a second wireless connection of the plurality of antennas within the information handling system while the plurality of applications or containers of related applications are operating within the information handling system;

the hardware processor executing code instructions of the dynamic antenna mapping task agent to:

receive real-time operational data within the information handling system;

perform a network bandwidth analysis for the plurality of applications or containers of related applications to determine the network bandwidth used by each of the plurality of applications or the containers of related applications;

access an application priority list and map that outlines which of the plurality of applications get priority to each of a plurality of wireless connections of the plurality of antennas and includes a map that outlines how each of the plurality of applications installed within the information handling system are to be connected to the plurality of wireless connections created at least partially based on an environment and network profile with one or more attributes of the plurality of applications installed within the information handling system; and generate a connectivity profile for the first application or the first container of related applications to use the first antenna and the first wireless connection and the second application or the second container of related applications to use the second antenna and the second wireless connection of the plurality of antennas within the information handling system while the plurality of applications or containers of related applications are operating within the information handling system based on the bandwidth of the wireless links being used and bandwidth needs of the first application or the first container of related applications and the second application or the second container of related applications as operations continue for the plurality of applications or containers of related applications on the information handling system.

8. The system of claim 7, wherein the dynamic antenna mapping task agent determines if one or more network metrics is outside of normal operating parameters and changes the optimized antenna mapping plan when the one or more networks is outside of normal operating parameters.

9. The system of claim 7, wherein attributes associated with at least one application comprises cadence, throughput, state, associations, timestamps, or a combination thereof.

10. The system of claim 9, further comprising:
the hardware processor executing code instructions of a learning module, wherein the learning module receives each of the environment and network profiles, the application priority list and map, and overall system network telemetry, and predicts future network issues and preemptively adjusts one or more radio and antenna settings for each of a plurality of applications at least partially based on predicted network issues and predicted usage of each of the plurality of applications.

11. The system of claim 10, wherein an overall system network telemetry is received from at least one radio access network (RAN).

12. The system of claim 11, wherein the overall system network telemetry comprises RAN location attributes, RAN network traffic, RAN capacity, RAN signal strength, or a combination thereof.

* * * * *